United States Patent
Shinohara et al.

(10) Patent No.: US 12,140,507 B2
(45) Date of Patent: Nov. 12, 2024

(54) VIBRATION DETECTION DEVICE, VIBRATION DETECTION METHOD, AND ABNORMALITY DETERMINATION SYSTEM

(71) Applicant: Mitsubishi Electric Engineering Company, Limited, Tokyo (JP)

(72) Inventors: Shinji Shinohara, Tokyo (JP); Teru Hatano, Tokyo (JP); Hisato Fujiwara, Tokyo (JP); Shinya Ishigami, Tokyo (JP)

(73) Assignee: MITSUBISHI ELECTRIC ENGINEERING COMPANY, LIMITED, Tokyo (JP)

(*) Notice: Subject to any disclaimer, the term of this patent is extended or adjusted under 35 U.S.C. 154(b) by 70 days.

(21) Appl. No.: 17/616,687

(22) PCT Filed: Sep. 10, 2020

(86) PCT No.: PCT/JP2020/034276
§ 371 (c)(1),
(2) Date: Dec. 6, 2021

(87) PCT Pub. No.: WO2021/049568
PCT Pub. Date: Mar. 18, 2021

(65) Prior Publication Data
US 2022/0334024 A1    Oct. 20, 2022

(30) Foreign Application Priority Data

Sep. 13, 2019  (WO) .................. PCT/JP2019/036117

(51) Int. Cl.
G01M 5/00    (2006.01)

(52) U.S. Cl.
CPC ................... *G01M 5/0066* (2013.01)

(58) Field of Classification Search
None
See application file for complete search history.

(56) References Cited

U.S. PATENT DOCUMENTS

2004/0030419 A1    2/2004  Miyasaka et al.
2008/0010039 A1    1/2008  Miyasaka et al.
(Continued)

FOREIGN PATENT DOCUMENTS

JP    6-109578 A    4/1994
JP    H07-77459 A   3/1995
(Continued)

OTHER PUBLICATIONS

English translation of JP2018128467A (Year: 2018).*
(Continued)

*Primary Examiner* — Matthew G Marini
(74) *Attorney, Agent, or Firm* — XSENSUS LLP

(57) ABSTRACT

A vibration detection device includes an A/D conversion unit for receiving a sine wave signal of an AE wave corresponding to vibration generated in a target machine from an AE sensor that detects the AE wave and converting the received sine wave signal into digital data, an extraction unit for extracting, from the digital data, a data point of a local maximum value for each cycle of the sine wave signal, and an output processing unit for outputting the data point extracted by the extraction unit and cycle data including data points with the number of points which can be recognized as a sine wave and including the data point of a local maximum value so that an output unit visibly outputs the data point and the cycle data.

18 Claims, 19 Drawing Sheets

(56) References Cited

U.S. PATENT DOCUMENTS

| | | | |
|---|---|---|---|
| 2008/0027659 A1 | 1/2008 | Miyasaka et al. | |
| 2012/0224239 A1 | 9/2012 | Aimono | |
| 2013/0006540 A1* | 1/2013 | Sakaguchi | F03D 17/00 702/34 |

FOREIGN PATENT DOCUMENTS

| | | |
|---|---|---|
| JP | 7-190849 A | 7/1995 |
| JP | 7-270228 A | 10/1995 |
| JP | 8-122142 A | 5/1996 |
| JP | 9-113416 A | 5/1997 |
| JP | 2002-107347 A | 4/2002 |
| JP | 2003-202276 A | 7/2003 |
| JP | 2003-344150 A | 12/2003 |
| JP | 2004-85273 A | 3/2004 |
| JP | 2005-49945 A | 2/2005 |
| JP | 2005-62154 A | 3/2005 |
| JP | 2006-322947 A | 11/2006 |
| JP | 2007-322947 A | 12/2007 |
| JP | 2008-20277 A | 1/2008 |
| JP | 2009-20090 A | 1/2009 |
| JP | 2010-196742 A | 9/2010 |
| JP | 2010-236929 A | 10/2010 |
| JP | 2011-154020 A | 8/2011 |
| JP | 2012-185314 A | 9/2012 |
| JP | 2013-132734 A | 7/2013 |
| JP | 2013-221827 A | 10/2013 |
| JP | 2017-62196 A | 3/2017 |
| JP | 2018-128467 A | 8/2018 |
| WO | 2018/193617 A1 | 10/2018 |

OTHER PUBLICATIONS

English translation of WO2018193617A1 (Year: 2018).*
English translation of JP 2005049945 A (Year: 2005).*
Griffin et al., Control of deviations and prediction of surface roughness from micro machining of THz waveguides using acoustic emission signals, Mechanical Systems and Signal Processing, 85 (2017) 1020-1034 (Year: 2017).*
Japanese Office Action issued Jan. 25, 2022 in Japanese Application No. 2021-531679.
International Search Report and Written Opinion mailed on Oct. 27, 2020, received for PCT Application PCT/JP2020/034276, Filed on Sep. 10, 2020, 12 pages including English Translation.
International Search Report and Written Opinion mailed on Nov. 26, 2019, received for PCT Application PCT/JP2019/036117, Filed on Sep. 13, 2019, 9 pages including English Translation.
Notice of Reasons for Refusal mailed on Sep. 14, 2021, received for JP Application 2021-531679, 9 pages including English Translation.
Japanese Office Action issued Jul. 4, 2023 in corresponding Japanese Patent Application No. 2022-114444 (with 1 machine-generated English translation), 9 pages.
Office Action and Search Report received for Chinese Patent Application No. 202080064135.8, mailed on Mar. 21, 2024, 12 pages.
Office Action dated Jul. 18, 2024, issued in corresponding Chinese Patent Application No. 202080064135.8, 15pp.

* cited by examiner

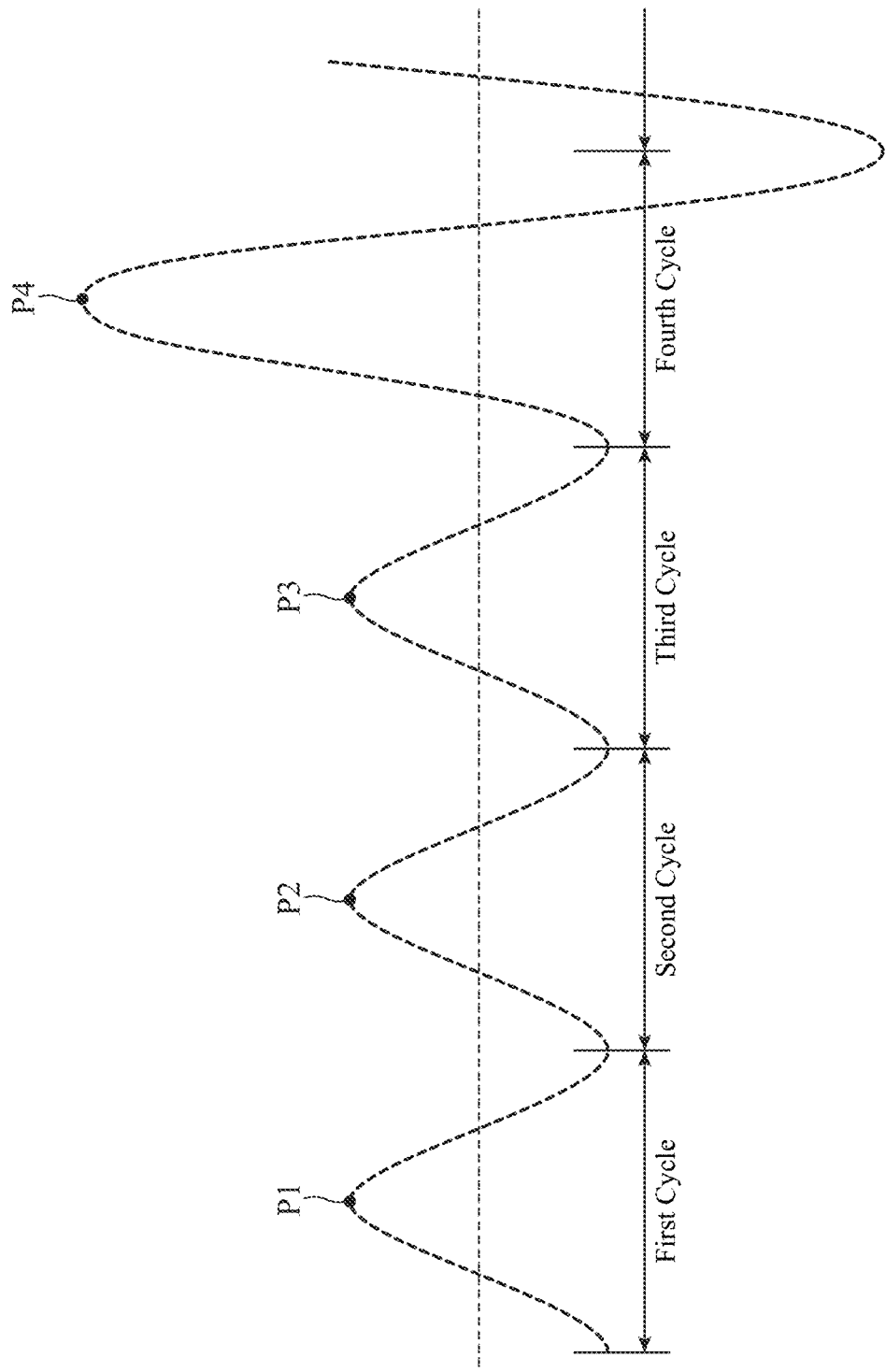

FIG. 20

|  |  | Current Time | | |
|---|---|---|---|---|
|  |  | Stable (Provisional) | Increasing (Provisional) | Decreasing (Provisional) |
| Previous Time | Stable (Provisional) | Stable (Determination) | Increasing (Provisional) | Decreasing (Provisional) |
|  | Increasing (Provisional) | Increasing (Determination) | Increasing (Provisional) | Noise Determination |
|  | Decreasing (Provisional) | Decreasing (Determination) | Decreasing → Increasing (Provisional) | Decreasing (Provisional) |
|  | Decreasing → Increasing (Provisional) | Increasing (Determination) | Decreasing → Increasing (Provisional) | Noise Determination |

VIBRATION DETECTION DEVICE, VIBRATION DETECTION METHOD, AND ABNORMALITY DETERMINATION SYSTEM

CROSS-REFERENCE TO RELATED APPLICATIONS

The present application is based on PCT filing PCT/JP2020/034276, filed Sep. 10, 2020, which claims priority of the international application PCT/JP2019/036117, filed on Sep. 13, 2019, the entire contents of each are incorporated herein by reference.

TECHNICAL FIELD

The present disclosure relates to a vibration detection device that detects vibration generated in a target machine, a vibration detection method, and an abnormality determination system that determines an abnormality of the target machine on the basis of the vibration generated in the target machine.

BACKGROUND ART

Conventionally, abnormality of a target machine is determined on the basis of sound or vibration generated in the target machine. For example, Patent Literature 1 describes a device that diagnoses abnormality of mechanical equipment on the basis of a peak value of digital measurement data of sound or vibration generated in a sliding member or a related member of the mechanical equipment. This device converts an analog signal of sound or vibration detected from a sliding member or a related member of mechanical equipment into a digital signal to generate digital measurement data, and calculates a level difference and a slope with respect to an immediately preceding data point for each data point of the digital measurement data to obtain a peak value.

CITATION LIST

Patent Literature

Patent Literature 1: JP 2007-322947A

SUMMARY OF INVENTION

Technical Problem

In the conventional technique described in Patent Literature 1, a temporal change trend of vibration generated in a target machine is analyzed on the basis of a peak value of digital measurement data representing vibration detected from the target machine, and abnormality of the target machine is diagnosed on the basis of the analysis result. However, in order to obtain digital measurement data, it is necessary to perform many signal processing such as A/D conversion processing for converting a signal representing vibration detected from a target machine into digital data, filter processing for obtaining a signal in a main frequency band from the digital data obtained by the A/D conversion processing, envelope processing for obtaining envelope data of the signal in the main frequency band, and fast Fourier transform (FFT) for performing frequency analysis on the envelope data, and there is a problem that a high performance signal processing device is required.

The present disclosure solves the above problem, and an object of the present disclosure is to provide a vibration detection device, a vibration detection method, and an abnormality determination system capable of reducing signal processing necessary for analyzing a temporal change trend of vibration generated in a target machine.

Solution to Problem

A vibration detection device according to the present disclosure includes processing circuitry to receive a sine wave signal of an acoustic emission (hereinafter, referred to as AE) wave corresponding to vibration generated in a target machine from an AE sensor that detects the AE wave and to convert the received sine wave signal into digital data, to extract a local maximum value of the sine wave signal from the digital data, and to output the local maximum value of the sine wave signal to an abnormality determination unit determining an abnormality of the target machine on a basis of a change in the local maximum value.

Advantageous Effects of Invention

According to the present disclosure, a sign wave signal of an AE wave is received from an AE sensor that detects the AE wave corresponding to vibration generated in a target machine and the received sine wave signal is converted into digital data, a local maximum value of the sine wave signal is extracted from the digital data, and the local maximum value of the sine wave signal is outputted to an abnormality determination unit determining an abnormality of the target machine on a basis of a change in the local maximum value. Furthermore, this cycle data can be generated by a simple process of extracting data points from digital data. As a result, the vibration detection device according to the present disclosure can reduce the signal processing necessary for analyzing the temporal change trend of the vibration generated in the target machine.

BRIEF DESCRIPTION OF DRAWINGS

FIG. 6 is an explanatory diagram illustrating a display example of cycle data in the first embodiment.

FIG. 20 is a table illustrating determination criteria of a change trend of a sine wave signal of an AE wave.

DESCRIPTION OF EMBODIMENTS

First Embodiment

Figure 1:
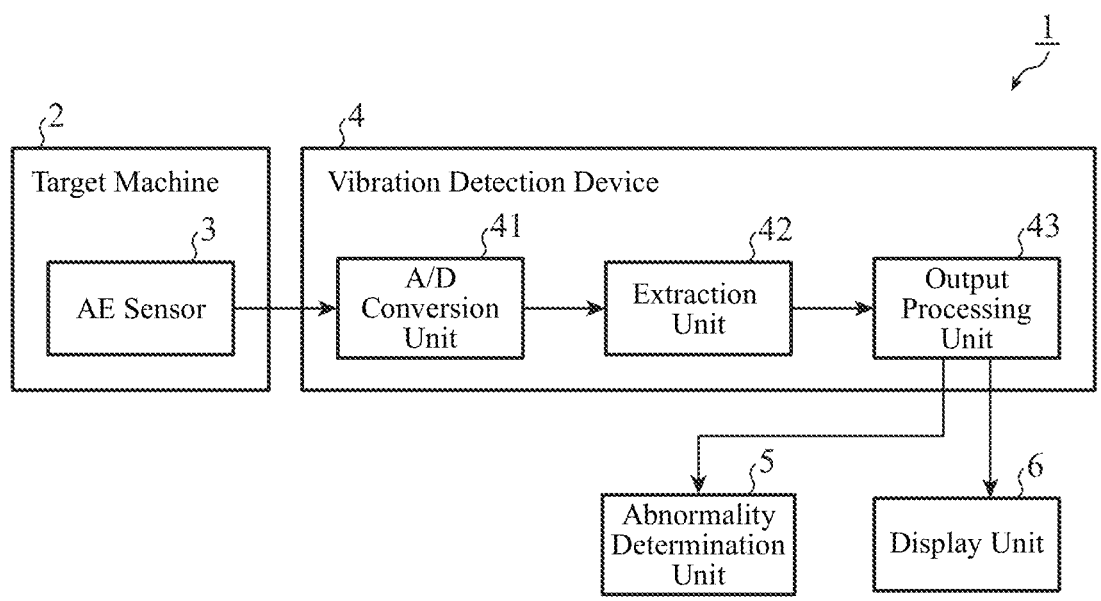
FIG. 1 is a block diagram showing a configuration of an abnormality determination system according to a first embodiment.

FIG. 1 is a block diagram showing a configuration of an abnormality determination system 1 according to the first embodiment. In FIG. 1, the abnormality determination system 1 determines the presence or absence of an abnormality in a target machine 2 on the basis of vibration generated in the target machine 2, and includes an AE sensor 3, a vibration detection device 4, an abnormality determination unit 5, and a display unit 6. The target machine 2 is, for example, a rotary machine such as a motor, a speed reducer, a cutting device, a pump, and a turbine. In addition, the vibration detection device 4 includes an A/D conversion unit 41, an extraction unit 42, and an output processing unit 43. For example, an external device connected to the vibration detection device 4 includes the abnormality determination unit 5 and the display unit 6. The external device is, for example, a personal computer used by an inspection worker of the target machine 2. However, the abnormality determination unit 5 and the display unit 6 may be components included in the vibration detection device 4. The display unit 6 is an output unit that displays data output from the vibration detection device 4.

The AE sensor 3 is attached to the target machine 2 and detects an AE wave corresponding to vibration generated in the target machine 2. AE is a phenomenon in which elastic energy stored inside a solid is released as an elastic wave (AE wave) when the solid is deformed or destroyed. The AE sensor 3 has a cantilever structure that outputs a sine wave signal of the AE wave detected from the target machine 2. This cantilever structure is an oscillation structure made of a piezoelectric material having a high Q value, and its resonance frequency is set in a frequency band of an AE wave.

Figure 2A:
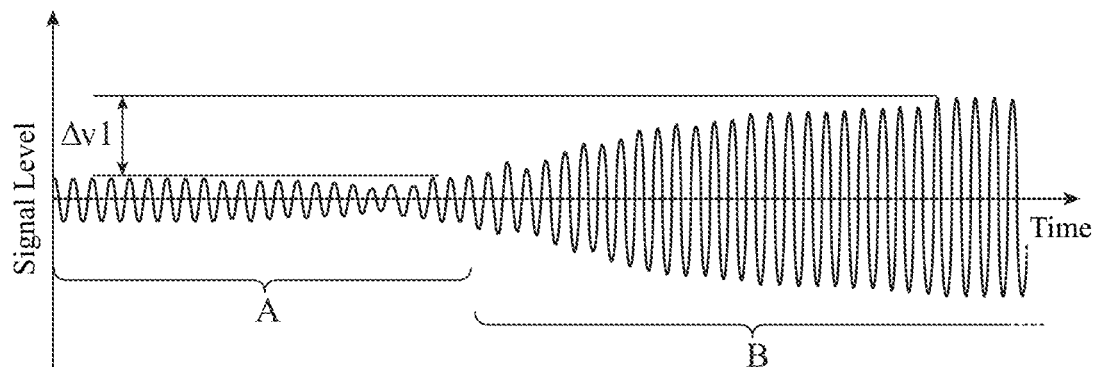
FIG. 2A is a waveform diagram illustrating an output waveform of an AE sensor.

A sine wave signal of an AE wave corresponding to a resonance frequency among wide-band (frequency components of several kHz to several MHz) AE waves corresponding to vibration generated by rotation of the rotary machine is output from the cantilever structure. FIG. 2A is a diagram illustrating an output waveform of the AE sensor 3, and FIG. 2B is a diagram illustrating digital data obtained by A/D converting an output signal of the AE sensor 3.

Figure 2B:
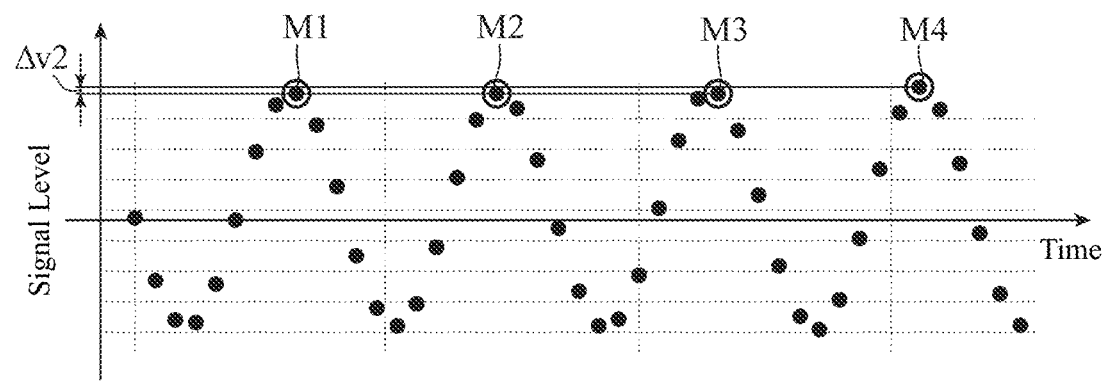
FIG. 2B is a diagram illustrating digital data obtained by A/D converting an output signal of the AE sensor.

In FIGS. 2A and 2B, the target machine 2 is a cutting device. The cutting device is a machine tool that cuts a workpiece rotated around a spindle with a cutting blade. In FIG. 2A, the period A is a period in which the workpiece is cut by a normal cutting blade, and the period B is a period in which the workpiece is cut by a cutting blade in which an abnormality has occurred. As the abnormality of the cutting blade, for example, an abnormality that occurs suddenly, such as a nick in the cutting blade, and in which the vibration between the cutting blade and the workpiece rapidly fluctuates can be considered.

The vibration generated between the cutting blade and the workpiece in the period A does not greatly fluctuate. At this time, the signal level of the sine wave signal of the AE wave detected by the AE sensor 3 from the cutting device is a level within a range corresponding to fluctuation of vibration generated between the cutting blade and the workpiece.

On the other hand, when an abnormality occurs in the cutting blade, the vibration generated between the cutting blade and the workpiece temporarily increases and then gradually returns to the original level. In response to the fluctuation of the vibration, the signal level of the sine wave signal of the AE wave becomes sufficiently higher than the signal level in the period A and then gradually returns to the original level. $\Delta v1$ illustrated in FIG. 2A is a value obtained by subtracting the maximum value of the signal level of the sine wave signal of the AE wave in the period A from the maximum value of the signal level of the sine wave signal of the AE wave in the period B. That is, when an abnormality occurs in the cutting blade, the signal level of the sine wave signal of the AE wave fluctuates by $\Delta v1$ at the maximum.

The digital data obtained by A/D converting the output signal of the AE sensor 3 in the period B by the A/D conversion unit 41 is a time series of a plurality of data points forming a sine wave as illustrated in FIG. 2B. However, in the A/D conversion by the A/D conversion unit 41, a measurement error occurs in the peak value for each cycle of the sine wave in accordance with the variation in the value of the data point sampled from the analog signal. For example, among the digital data for each cycle of the sine wave signal, data points M1 to M4 of the local maximum values have a measurement error of $\Delta v2$ (=signal level of M4−signal level of M3) at the maximum.

As a result of an experimental analysis conducted by the inventor on such vibration detection using the AE sensor 3, it has been confirmed that the signal of the AE wave detected by the AE sensor 3 is output as a sine wave, and when a large vibration fluctuation suddenly occurs in the target machine 2, the change amount $\Delta v1$ of the signal level corresponding to the vibration fluctuation becomes sufficiently larger than the measurement error $\Delta v2$ of the peak value. Since $\Delta v1$ is sufficiently larger than $\Delta v2$, it can be understood that the local maximum value or the local minimum value can be accurately extracted from the sine wave.

Focusing on the fact that the change amount $\Delta v1$ of the signal level of the sine wave signal of the AE wave is sufficiently larger than the measurement error $\Delta v2$ of the peak value, the vibration detection device 4 generates data indicating the temporal change of the vibration generated in the target machine 2. That is, the extraction unit 42 extracts the data point of the local maximum value for each cycle of the sine wave signal from the digital data of the sine wave signal of the AE wave detected by the AE sensor 3 from the target machine 2. The time-series data of the data points of the local maximum values extracted by the extraction unit 42 indicates the temporal change of the vibration generated in the target machine 2, and is used for analyzing the temporal change trend of the vibration generated in the target machine 2.

In the conventional device described in Patent Literature 1, as described above, many pieces of signal processing such as A/D conversion, filter processing, envelope processing, and FFT are required to obtain data for analyzing a temporal change trend of vibration generated in the target machine 2, and a large storage capacity is required to store data obtained by these pieces of signal processing.

On the other hand, the vibration detection device 4 can generate analysis data for analyzing a temporal change trend of vibration by a simple process of extracting data points from digital data. As a result, it is possible to greatly reduce the signal processing necessary for analyzing the temporal change trend of the vibration generated in the target machine 2. Further, since the analysis data includes only the data points of the local maximum value, it is only necessary to store the data points of the local maximum value extracted from the digital data in order when generating the analysis data. Therefore, it is also possible to reduce the storage capacity required for analyzing the temporal change trend of the vibration generated in the target machine 2. Furthermore, the output processing unit 43 included in the vibration detection device 4 outputs the data points of the local maximum value and cycle data including the data points with the number of points which can be recognized as a sine wave and including the data points of the local maximum value so that the display unit 6 visibly outputs the data points and the cycle data. For example, an inspection worker of the target machine 2 can easily determine whether or not the cycle data is noise on the basis of the magnitude of the local maximum value in the cycle data displayed on the display unit 6 without using an expensive oscilloscope. As a result, the vibration detection device 4 can reduce the signal processing necessary for analyzing the temporal change trend of the vibration generated in the target machine 2 and can provide data that enables visual recognition of whether the cycle data is detected data of the vibration of the target machine 2 or noise.

The abnormality determination unit 5 determines an abnormality of the target machine 2 on the basis of data including data points of a local maximum value for each cycle of the sine wave signal of the AE wave. For example, in the abnormality determination unit 5, a change rate (for example, the change rate obtained by simulating the target machine 2 in the abnormal state) of the sine wave signal of the AE wave obtained by a preliminary experiment is set as a determination threshold value. The abnormality determination unit 5 calculates the change rate of the sine wave signal of the AE wave by using the data determined not to be noise by visually recognizing the cycle data displayed on the display unit 6 among the data generated by the vibration detection device 4, and compares the calculated change rate with the determination threshold value. The abnormality determination unit 5 determines that no abnormality has occurred in the target machine 2 when the change rate of the sine wave signal of the AE wave is smaller than the determination threshold value, and determines that an abnormality has occurred in the target machine 2 when the change rate of the sine wave signal of the AE wave is equal to or greater than the determination threshold value.

Figure 3:
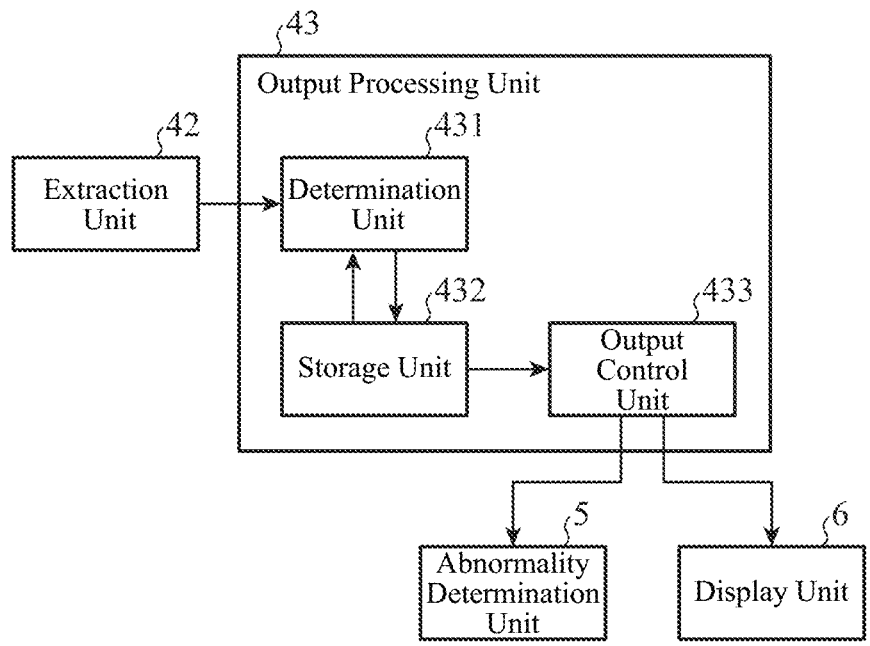
FIG. 3 is a block diagram illustrating a configuration of an output processing unit in FIG. 1.

FIG. 3 is a block diagram illustrating a configuration of the output processing unit 43. The output processing unit 43 outputs the data point of the local maximum value extracted by the extraction unit 42 and the cycle data so that the data point and the cycle data are visibly displayed on the display unit 6. The number of points which can be recognized as a sine wave is, for example, about 20 points. As illustrated in FIG. 3, the output processing unit 43 includes a determination unit 431, a storage unit 432, and an output control unit 433. The determination unit 431 compares the local maximum value of the data point extracted by the extraction unit 42 with the maximum value of the data points stored in the storage unit 432, and determines which is larger.

The storage unit 432 stores a data point of a maximum value in the determination period of the sine wave signal of the AE wave and cycle data including the data point. The output control unit 433 visibly displays the data point of a maximum value and the cycle data including the data point stored in the storage unit 432 on the display unit 6. The output control unit 433 outputs the data point of the maximum value included in the cycle data determined not to be noise to the abnormality determination unit 5. The abnormality determination unit 5 determines an abnormality of the target machine 2 on the basis of the data output from the output control unit 433.

Figure 4:
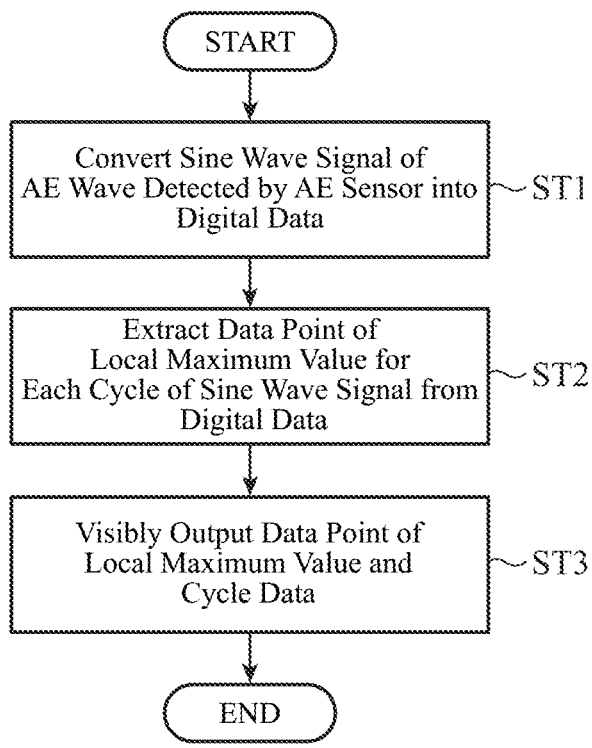
FIG. 4 is a flowchart showing a vibration detection method according to the first embodiment.

FIG. 4 is a flowchart illustrating the vibration detection method according to the first embodiment, and illustrates a series of processing performed by the vibration detection device 4 illustrated in FIG. 1. The AE sensor 3 detects an AE wave corresponding to vibration generated in the target machine 2. The A/D conversion unit 41 receives a sine wave signal of the AE wave detected by the AE sensor 3, and converts the received sine wave signal into digital data (step ST1).

Next, the extraction unit 42 receives the digital data converted by the A/D conversion unit 41, and extracts the data point of the local maximum value for each cycle of the sine wave signal from the received digital data (step ST2). For example, the extraction unit 42 extracts a data point of a local maximum value for each cycle of the sine wave signal and cycle data including the data point of the local maximum value from the digital data of the sine wave signal of the AE wave. The data point of the local maximum value and the cycle data extracted by the extraction unit 42 are output to the output processing unit 43.

The extraction unit 42, when extracting a data point of a local minimum value instead of extracting a data point of a local maximum value from the digital data of the sine wave signal of the AE wave, inverts the sign of the extracted data point. As a result, the extraction unit 42 can generate data for analysis similar to the case of extracting a data point of a local maximum value. Note that, since noise that changes to the plus side of the sine wave is superimposed on the sine wave signal of the AE wave, it is possible to reduce erroneous noise extraction by extracting the local minimum value that is the peak value on the minus side of the sine wave.

The output processing unit 43 visibly displays the data point of the local maximum value extracted by the extraction unit 42 and the cycle data including the data point on the display unit 6 (step ST3). For example, the determination unit 431 included in the output processing unit 43 compares the data points of the local maximum value extracted for each cycle in order by the extraction unit 42 with the data point of the maximum value stored in the storage unit 432 during the determination period, and determines which is larger. The determination period is, for example, a period in which the target machine 2 is in an individual state in a case where the state changes in order in accordance with the operation of the target machine 2.

For example, when the target machine 2 is a cutting device, the processing of cutting the workpiece by the cutting device includes a first idling state before the cutting blade is brought into contact with the workpiece, a machining state in which cutting is performed with the cutting blade brought into contact with the workpiece, and a second idling state in which the cutting blade is separated from the workpiece. The storage unit 432 stores the data point of the local maximum value and the cycle data including the data point for each state of the target machine 2.

Further, the state of the target machine 2 varies depending on the operating condition. For example, the machining state of the cutting device changes depending on the material of the workpiece, changes depending on the state of the cutting blade, and changes depending on the difference in the number of rotations of the cutting blade or the workpiece. The extraction unit 42 extracts the data points of the local maximum value for each cycle of the sine wave signal of the AE wave in order for each state and each operating condition of the target machine 2. The determination unit 431 compares the data point of the local maximum value extracted by the extraction unit 42 with the data point of the maximum value stored in the storage unit 432 to determine the data point of the maximum value and the cycle data including the data point for each state of the target machine 2.

When it is determined that the value of the data point stored in the storage unit 432 is smaller than the value of the data point newly extracted by the extraction unit 42, the storage unit 432 overwrites the data point newly extracted by the extraction unit 42 and the cycle data including the data point to the data point and the cycle data stored until then. As a result, among the digital data of the sine wave signal of the AE wave detected from the target machine 2, the data point of the maximum value and the cycle data including the data point are stored in the storage unit 432. In this manner, by storing only the data point of the maximum value and the cycle data including this data point in the storage unit 432, it is possible to suppress an increase in the storage capacity required for storing the cycle data.

The output control unit 433 visibly displays the data point of the local maximum value and the cycle data including the data point stored in the storage unit 432 on the display unit 6. An inspection worker of the target machine 2 determines whether or not the cycle data is noise on the basis of the magnitude of the local maximum value in the cycle data displayed on the display unit 6. For example, when the determination result that the cycle data is not noise is input by the inspection worker, the output control unit 433 outputs the data point of the local maximum value stored in the storage unit 432 to the abnormality determination unit 5. The abnormality determination unit 5 determines an abnormality of the target machine 2 on the basis of the data output from the output control unit 433.

Figure 5:
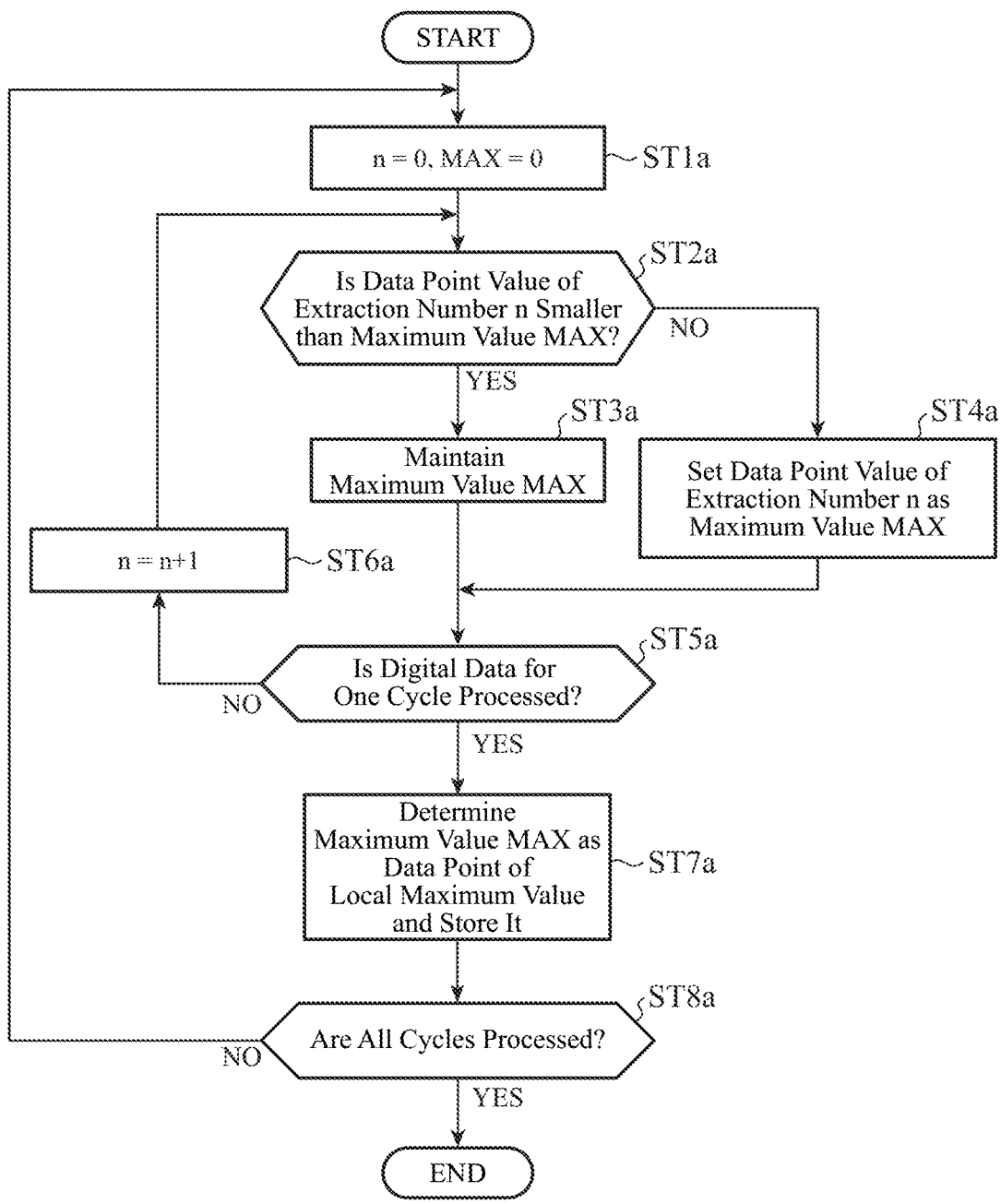
FIG. 5 is a flowchart showing detailed processing in step ST2 of FIG. 4.

Next, processing of extracting the data point of the local maximum value for each cycle from the digital data of the sine wave signal of the AE wave will be described in detail. FIG. 5 is a flowchart showing detailed processing in step ST2 of FIG. 4. In FIG. 5, n is an extraction number indicating an extraction order of a data point, and is a natural number of 0 or more. MAX is a maximum value of the data point. The extraction unit 42 extracts the data points with the extraction number n in order, and searches for the data point of the local maximum value from among the extracted data points.

First, the extraction unit 42 sets 0 to n and MAX (step ST1$a$), and extracts a data point with an extraction number n (=0) from the digital data of the sine wave signal of the AE wave. Subsequently, the extraction unit 42 checks whether or not the value of the data point with the extraction number n is smaller than the maximum value MAX (step ST2$a$).

If the value of the data point with the extraction number n is smaller than the maximum value MAX (step ST2$a$; YES), the extraction unit 42 maintains the maximum value MAX (step ST3$a$). For example, when the extraction of the data point is started, the maximum value MAX is 0. At this time, when the extracted data point is a data point on the minus side of the sine wave, the value of the data point is smaller than the maximum value MAX, and thus the extraction unit 42 performs the processing of step ST3$a$.

On the other hand, when the value of the data point with the extraction number n is greater than or equal to the maximum value MAX (step ST2$a$; NO), the extraction unit 42 sets the value of the data point with the extraction number n as the maximum value MAX (step ST4$a$). As a result, the maximum value MAX is replaced with the value of the data point with the extraction number n.

When the processing of step ST3$a$ or step ST4$a$ is completed, the extraction unit 42 checks whether or not digital data for one cycle of a sine wave has been processed (step ST5a). For example, the extraction unit 42, when extracting the data points with the number of points by which the sine wave of one cycle can be recognized, determines that the digital data of one cycle of the sine wave has been processed and the search for the data point of the local maximum value has been completed. Note that the number of points which can be recognized as a sine wave for one cycle depends on the sampling resolution in the A/D conversion, and is, for example, about 20 points.

When the digital data processing for one cycle of the sine wave is not completed (step ST5a; NO), the extraction unit 42 adds one to the extraction number n (step ST6a), and returns to the processing of step ST2a. As a result, the data point with the next extraction number n is extracted from the digital data of the sine wave signal of the AE wave, and the search for the data point of the local maximum value is continued.

In a case where the digital data processing for one cycle of the sine wave has been completed (step ST5a; YES), the extraction unit 42 determines the maximum value MAX as the data point of the local maximum value and stores the maximum value MAX in the memory (step ST7a). Subsequently, the extraction unit 42 checks whether or not all the cycles of the sine wave signal of the AE wave have been processed (step ST8a). Here, the extraction unit 42 checks whether or not the above-described series of processing has been performed for all cycles of the sine wave signal of the AE wave detected by the AE sensor 3 in a certain detection period (for example, a processing period of the workpiece by the machine tool). At this time, if there is an unprocessed cycle (step ST8a; NO), the extraction unit 42 returns to step ST1a, sets 0 to the extraction number n of the data point, sets 0 to the maximum value MAX, and then performs a series of processing from step ST2a on the data point of the next cycle.

On the other hand, in a case where processing has been performed for all cycles in the sine wave signal of the AE wave (step ST8a; YES), the extraction unit 42 ends the processing of FIG. 5. Thereafter, the extraction unit 42 reads the data point of the local maximum value for each cycle from the memory, and outputs data of the read data point to the abnormality determination unit 5.

Note that, in the case of extracting the data point of the local minimum value in FIG. 5, for example, the minimum value MIN is set instead of the maximum value MAX. The extraction unit 42 checks whether or not the value of the data point with the extraction number n is larger than the minimum value MIN (step ST2a). If the value of the data point with the extraction number n is larger than the minimum value MIN (step ST2a; YES), the process proceeds to step ST3a, and if the value of the data point with the extraction number n is less than or equal to the minimum value MIN (step ST2a; NO), the process proceeds to step ST4a. The processing in step ST3a and step ST4a is performed on the minimum value MIN. The extraction unit 42 determines the minimum value MIN as a data point of the local minimum value, inverts the sign of the minimum value MIN, and then stores the data point in the memory (step ST7a). After these pieces of processing are completed, the extraction unit 42 outputs the data of the data point of the local minimum value for each cycle read from the memory to the abnormality determination unit 5.

FIG. 6 is an explanatory diagram illustrating a display example of cycle data in the first embodiment. The output control unit 433 displays the cycle data including the data point of the local maximum value stored in the storage unit 432 on the display unit 6. In FIG. 6, in the first cycle, cycle data including a data point P1 of the local maximum value is displayed on the display unit 6. Since the sine wave of the cycle data of the first cycle is displayed on the display unit 6, an inspection worker can determine that the cycle data is not noise but detected data of vibration of the target machine 2.

For example, when the determination unit 431 determines that the value of a data point P2 extracted in the second cycle is greater than or equal to the value of the data point P1, the data point P2 of the local maximum value and the cycle data are stored in the storage unit 432. The output control unit 433 displays the cycle data including the data point of the local maximum value of the second cycle stored in the storage unit 432 on the display unit 6. Similarly to the first cycle, since the sine wave of the cycle data of the second cycle is displayed on the display unit 6, an inspection worker can determine that the cycle data is not noise but detected data of vibration of the target machine 2. In a similar procedure, the inspection worker determines that the cycle data of the third cycle is not noise but detected data of vibration of the target machine 2.

When the determination unit 431 determines that the value of the data point P4 extracted in the fourth cycle by the extraction unit 42 is greater than or equal to the value of the data point P3, the data point P4 of the maximum value and the cycle data including the data point are stored in the storage unit 432. The output control unit 433 displays the cycle data including the data point P4 stored in the storage unit 432 on the display unit 6. Since in the cycle data of the fourth cycle displayed on the display unit 6, the value of the data point P4 is significantly large as illustrated in FIG. 6, an inspection worker can determine that the data of the fourth cycle includes noise.

Next, the hardware configuration that implements the functions of the vibration detection device 4 will be described.

The functions of the A/D conversion unit 41, the extraction unit 42, and the output processing unit 43 in the vibration detection device 4 are implemented by a processing circuit. That is, the vibration detection device 4 includes a processing circuit for executing the processing from step ST1 to step ST3 shown in FIG. 4. The processing circuit may be dedicated hardware or a central processing unit (CPU) that executes a program stored in a memory.

Figure 7A:
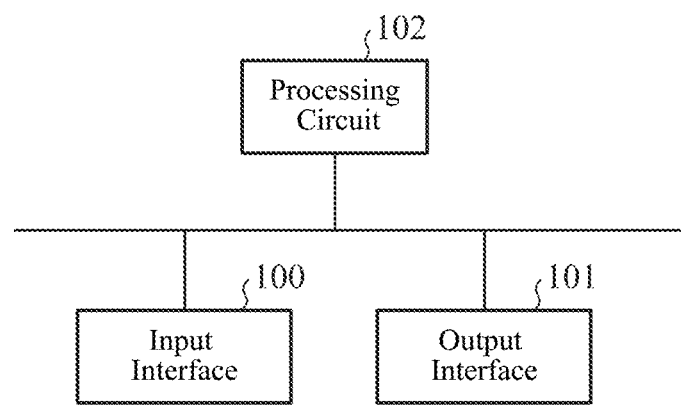
FIG. 7A is a block diagram illustrating a hardware configuration for implementing functions of a vibration detection device according to the first embodiment.
Figure 7B:
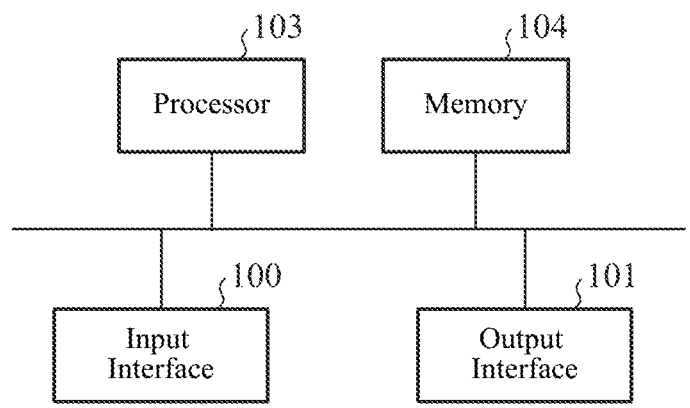
FIG. 7B is a block diagram illustrating a hardware configuration for executing software for implementing the functions of the vibration detection device according to the first embodiment.

FIG. 7A is a block diagram illustrating a hardware configuration for implementing the functions of the vibration detection device 4, and FIG. 7B is a block diagram illustrating a hardware configuration for executing software that implements the functions of the vibration detection device 4. In FIGS. 7A and 7B, the input interface 100 relays the sine wave signal output from the AE sensor 3 to the vibration detection device 4. The output interface 101 relays data output from the vibration detection device 4 to the abnormality determination unit 5 or the display unit 6.

In a case where the processing circuit is a processing circuit 102 of dedicated hardware shown in FIG. 7A, the processing circuit 102 corresponds, for example, to a single circuit, a composite circuit, a programmed processor, a parallel-programmed processor, an application specific integrated circuit (ASIC), a field-programmable gate array (FPGA), or a combination thereof. The functions of the A/D conversion unit 41, the extraction unit 42, and the output processing unit 43 in the vibration detection device 4 may be implemented by separate processing circuits, or these functions may be collectively implemented by one processing circuit.

When the processing circuit is a processor 103 shown in FIG. 7B, the functions of the A/D conversion unit 41, the extraction unit 42, and the output processing unit 43 in the vibration detection device 4 are implemented by software, firmware, or a combination of software and firmware. Note that, software or firmware is written as a program and stored in a memory 104.

The processor 103 reads and executes the program stored in the memory 104, thereby implementing the functions of the A/D conversion unit 41, the extraction unit 42, and the output processing unit 43 in the vibration detection device 4. That is, the vibration detection device 4 includes a memory 104 for storing programs in which the processing from step ST1 to step ST3 in the flowchart shown in FIG. 4 are executed as a result when executed by the processor 103. These programs cause a computer to execute procedures or methods performed by the A/D conversion unit 41, the extraction unit 42, and the output processing unit 43. The memory 104 may be a computer-readable storage medium that stores a program for causing the computer to function as the A/D conversion unit 41, the extraction unit 42, and the output processing unit 43.

Examples of the memory 104 correspond to a nonvolatile or volatile semiconductor memory, such as a random access memory (RAM), a read only memory (ROM), a flash memory, an erasable programmable read only memory (EPROM), or an electrically-EPROM (EEPROM), a magnetic disk, a flexible disk, an optical disk, a compact disk, a mini disk, and a DVD.

A part of the functions of the A/D conversion unit 41, the extraction unit 42, and the output processing unit 43 in the vibration detection device 4 may be implemented by dedicated hardware, and a part thereof may be implemented by software or firmware. For example, the function of the A/D conversion unit 41 is implemented by the processing circuit 102 which is dedicated hardware, and the functions of the extraction unit 42 and the output processing unit 43 are implemented by the processor 103 reading and executing the programs stored in the memory 104. Thus, the processing circuit can implement the above functions by hardware, software, firmware, or a combination thereof.

As described above, the vibration detection device 4 according to the first embodiment includes the A/D conversion unit 41, the extraction unit 42, and the output processing unit 43. The sine wave signal of the AE wave corresponding to the vibration generated in the target machine 2 is converted into digital data, the data point of the local maximum value is extracted from the digital data for each cycle of the sine wave signal, and the extracted data point of the local maximum value and the cycle data including the data points with the number of points which can be recognized as the sine wave and including the data point of the local maximum value are displayed on the display unit 6. This cycle data is data indicating a temporal change in vibration generated in the target machine 2, and can be used as data for analyzing a temporal change trend of vibration. Further, the cycle data can be generated by a simple process of extracting data points from the digital data. Further, whether or not the cycle data displayed on the display unit 6 is noise can be easily determined on the basis of the magnitude of the local maximum value for each cycle without using an expensive oscilloscope. As a result, the vibration detection device 4 can reduce the signal processing necessary for analyzing the temporal change trend of the vibration generated in the target machine 2, and can provide data that enables visual recognition of whether the cycle data is detected data of the vibration of the target machine 2 or noise.

Second Embodiment

Figure 8:
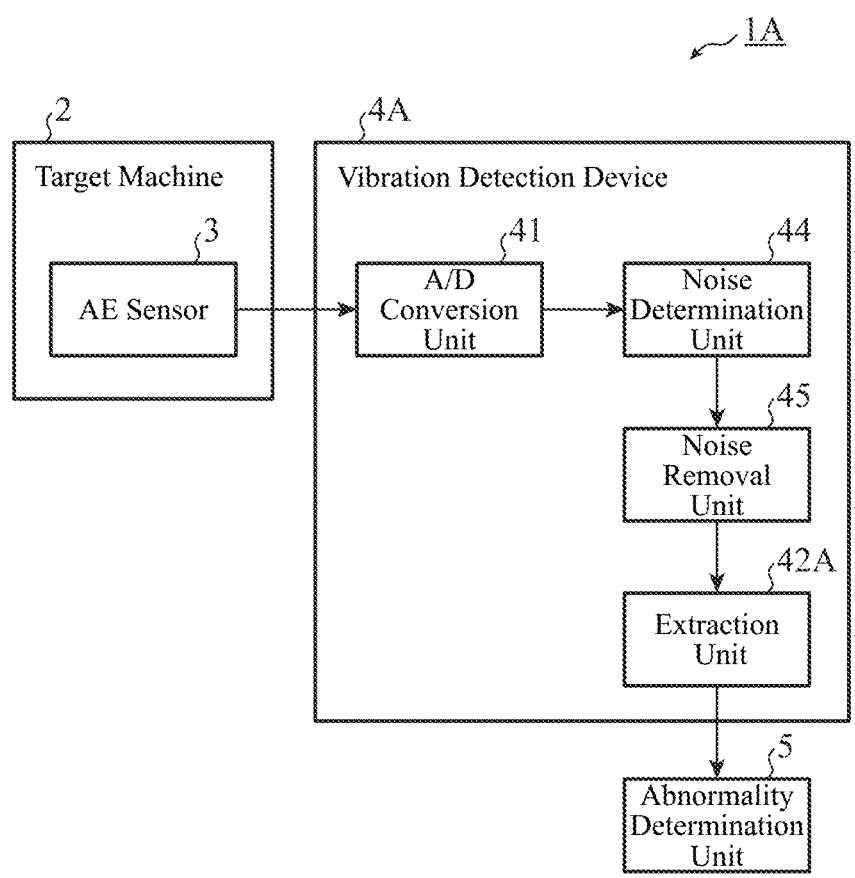
FIG. 8 is a block diagram showing a configuration of an abnormality determination system according to a second embodiment.

A vibration detection device according to the second embodiment has a configuration for removing noise from digital data of a sine wave signal of an AE wave. FIG. 8 is a block diagram showing a configuration of an abnormality determination system 1A according to the second embodiment. In FIG. 8, the same components as those in FIG. 1 are designated by the same reference numerals, and the description thereof will be omitted. The abnormality determination system 1A is a system that determines the presence or absence of an abnormality of the target machine 2 on the basis of vibration generated in the target machine 2, and includes an AE sensor 3, a vibration detection device 4A, and an abnormality determination unit 5. The vibration detection device 4A includes an A/D conversion unit 41, an extraction unit 42A, a noise determination unit 44, and a noise removal unit 45.

The extraction unit 42A extracts a data point of a local maximum value or a local minimum value from digital data from which a data point of a cycle including noise has been removed, among the digital data of the sine wave signal of the AE wave. For example, the extraction unit 42A extracts the data point of the local maximum value from the digital data from which the data point of the cycle including the noise has been removed. Data of the extracted data point is output to the abnormality determination unit 5. Furthermore, the extraction unit 42A, when extracting the data point of the local minimum value instead of extracting the data point of the local maximum value, inverts the sign of the extracted data point.

The noise determination unit 44 determines noise of digital data of the sine wave signal of the AE wave. For example, the noise determination unit 44 determines noise for each cycle on the basis of a result of comparing a sum AD_SUM of the data points for each cycle of the sine wave signal with a determination value. Note that the determination value is, for example, 0 or a DC offset value.

The noise removal unit 45 removes the noise determined by the noise determination unit 44 from the digital data of the sine wave signal of the AE wave. For example, the noise removal unit 45 removes all data points of a cycle including noise from the digital data of the sine wave signal of the AE wave.

Figure 9:
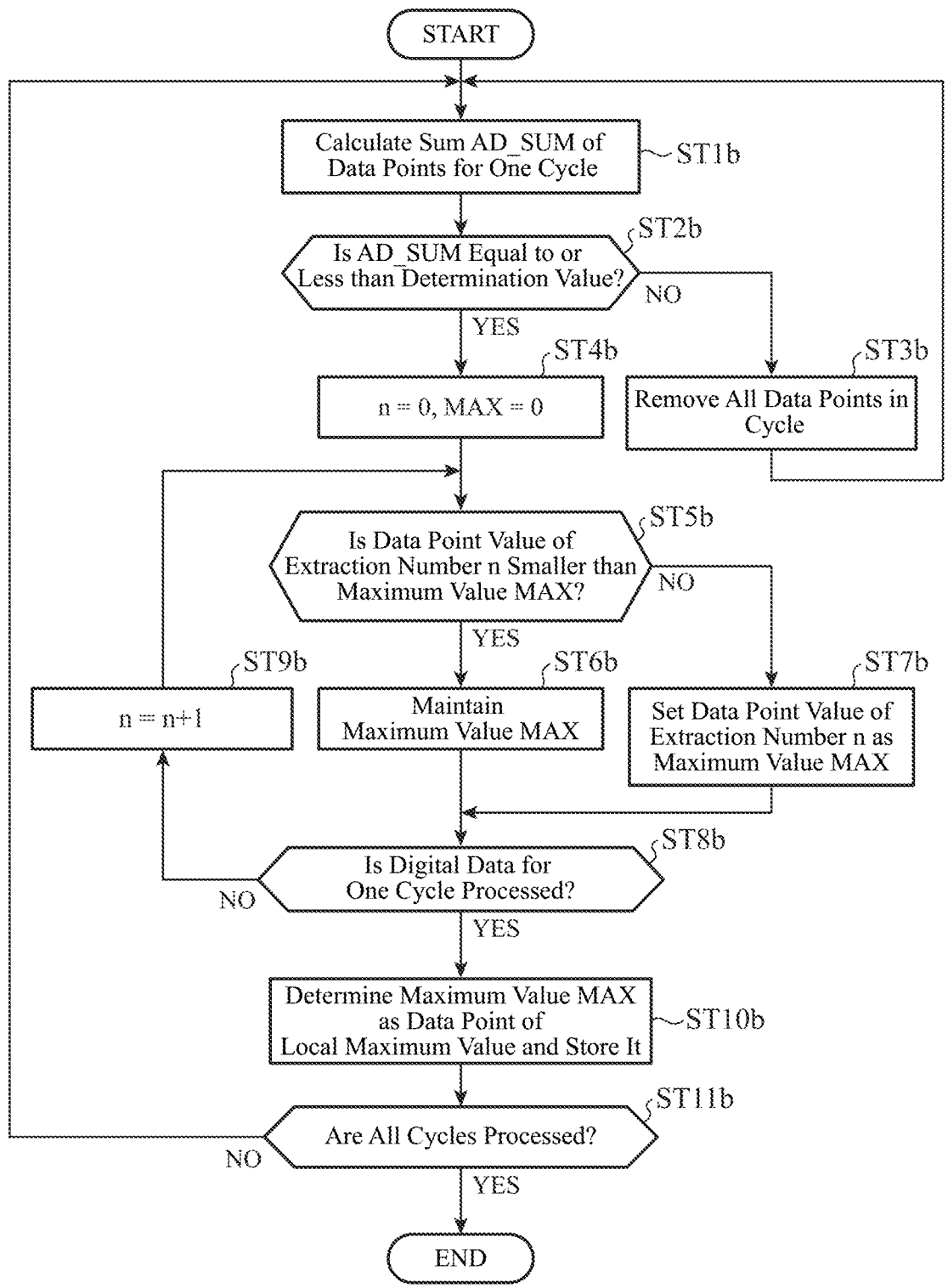
FIG. 9 is a flowchart showing a vibration detection method according to the second embodiment.

Next, an example of processing of extracting the data point of the local maximum value from the digital data from which the data point of the cycle including noise has been removed will be described. FIG. 9 is a flowchart illustrating a vibration detection method according to the second embodiment, and illustrates an example of a series of processing performed by the noise determination unit 44, the noise removal unit 45, and the extraction unit 42A. Steps ST4b to ST11b in FIG. 9 are similar to processing of step ST1a to step ST8a in FIG. 5, and thus description thereof is omitted. Note that n is an extraction number indicating an extraction order of a data point, and is a natural number of 0 or more. MAX is a maximum value of the data point.

The noise determination unit 44 receives digital data for each cycle of the sine wave signal of the AE wave, and calculates a sum AD_SUM of data points for one cycle using the received digital data (step ST1b). For example, the noise determination unit 44 receives data points in order, the number (about 20) of which can form one cycle of the sine wave, from the digital data of the sine wave signal of the AE wave, and adds the values of the received data points in order to calculate the sum AD_SUM.

Subsequently, the noise determination unit 44 checks whether or not the sum AD_SUM is equal to or less than a determination value (step ST2*b*). In a sine wave signal having no DC offset, absolute values of signal levels are the same between the plus side and the minus side of a sine wave of one cycle. In addition, noise that changes to the plus side of the sine wave is superimposed on the sine wave signal of the AE wave. When the measurement error due to the sampling variation in the A/D conversion processing is neglected, the sum AD_SUM is 0 when the digital data for one cycle does not include noise, and the sum AD_SUM is a value larger than 0 when noise is included.

In addition, when the data point of the sine wave signal of the AE wave includes a DC offset, each data point of one cycle includes a DC offset. When the measurement error due to the sampling variation in the A/D conversion processing is neglected, if no noise is included in each data point of one cycle, the sum AD_SUM has a value obtained by adding the DC offset included in each data point extracted in one cycle. On the other hand, in a case where noise is included, the sum AD_SUM has a value larger than a value obtained by adding the DC offset included in each data point extracted in one cycle.

Therefore, in the noise determination unit 44, for example, when there is no DC offset in the digital data of the sine wave signal of the AE wave, 0 is set as the determination value. In a case where there is a DC offset in the digital data of the sine wave signal of the AE wave, a value obtained by adding the DC offset included in each data point extracted in one cycle is set as the determination value in the noise determination unit 44.

When the sum AD_SUM is larger than the determination value (step ST2*b*; NO), the noise determination unit 44 determines that noise is included in the cycle in which the sum AD_SUM is obtained, and notifies the noise removal unit 45 of the determination result. The noise removal unit 45 removes all the data points in the cycle in which the sum AD_SUM is obtained from the digital data of the sine wave signal of the AE wave on the basis of the determination result notified from the noise determination unit 44 (step ST3*b*). Thereafter, the noise determination unit 44 performs processing from step ST1*b* for the next cycle.

In a case where the sum AD_SUM is equal to or less than the determination value (step ST2*b*; YES), the noise determination unit 44 determines that noise is not included in the cycle in which the sum AD_SUM is obtained, and notifies the extraction unit 42A of the determination result. The extraction unit 42A performs a series of processes from step ST4*b* for the data points of the cycle in which the sum AD_SUM is obtained on the basis of the determination result notified from the noise determination unit 44. As described above, the extraction unit 42A extracts the data point of the local maximum value from the digital data from which the data points of the cycle including noise have been removed. As a result, erroneous noise extraction can be reduced.

The abnormality determination unit 5 determines an abnormality of the target machine 2 on the basis of data of a data point of a local maximum value or a local minimum value extracted for each cycle of the sine wave signal from the digital data of the sine wave signal of the AE wave. The data of the data point of the local maximum value or the local minimum value is extracted from the digital data from which the data points of the cycle including noise have been removed. By using the data in which the erroneous noise extraction is reduced in this manner, the accuracy of the abnormality determination of the target machine 2 by the abnormality determination unit 5 is improved.

Note that in the case of extracting the data point of the local minimum value in FIG. 9, for example, the minimum value MIN is set instead of the maximum value MAX. The extraction unit 42A checks whether or not the value of the data point with the extraction number n is larger than the minimum value MIN (step ST5*b*). If the value of the data point with the extraction number n is larger than the minimum value MIN (step ST5*b*; YES), the process proceeds to step ST6*b*, and if the value of the data point with the extraction number n is equal to or less than the minimum value MIN (step ST5*b*; NO), the process proceeds to step ST7*b*. The processing in step ST6*b* and step ST7*b* is performed on the minimum value MIN. The extraction unit 42A determines the minimum value MIN as a data point of the local minimum value, inverts the sign of the minimum value MIN, and then stores the data point in the memory (step ST10*b*).

The functions of the A/D conversion unit 41, the extraction unit 42A, the noise determination unit 44, and the noise removal unit 45 in the vibration detection device 4A are implemented by a processing circuit. That is, the vibration detection device 4A includes a processing circuit for executing the processing from step ST1*b* to step ST11*b* shown in FIG. 9. The processing circuit may be the processing circuit 102 of dedicated hardware shown in FIG. 7A or the processor 103 that executes programs stored in the memory 104 shown in FIG. 7B.

As described above, the vibration detection device 4A according to the second embodiment includes the extraction unit 42A, the noise determination unit 44, and the noise removal unit 45. The noise determination unit 44 determines noise for each cycle on the basis of a result of comparing the sum AD_SUM of the data points for each cycle of the sine wave signal with the determination value. The noise removal unit 45 removes all data points of a cycle including noise. The extraction unit 42A extracts the data point of the local maximum value or the local minimum value from the digital data from which the data point of the cycle including the noise has been removed by the noise removal unit 45. Since the data points of the cycle including noise are removed, erroneous noise extraction can be reduced.

Third Embodiment.

Figure 10:
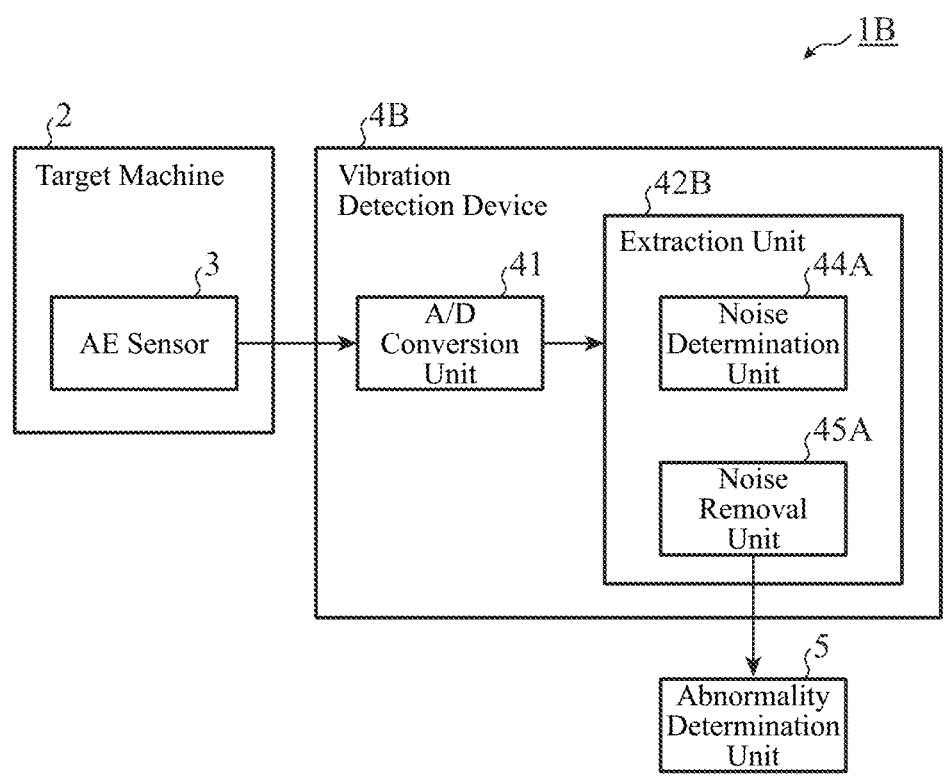
FIG. 10 is a block diagram showing a configuration of an abnormality determination system according to a third embodiment.

FIG. 10 is a block diagram showing a configuration of an abnormality determination system 1B according to the third embodiment. In FIG. 10, the same components as those in FIG. 1 are designated by the same reference numerals, and the description thereof will be omitted. The abnormality determination system 1B is a system that determines the presence or absence of an abnormality of the target machine 2 on the basis of vibration generated in the target machine 2, and includes an AE sensor 3, a vibration detection device 4B, and an abnormality determination unit 5. The vibration detection device 4B includes an A/D conversion unit 41 and an extraction unit 42B. Furthermore, the extraction unit 42B includes a noise determination unit 44A and a noise removal unit 45A.

The extraction unit 42B extracts a data point of a local maximum value or a local minimum value from the data point of the cycle from which the noise has been removed, among the digital data of the sine wave signal of the AE wave. For example, the extraction unit 42B extracts the data point of the local maximum value from the data points of the cycle from which the noise has been removed. The data point extracted by the extraction unit 42B is output to the abnormality determination unit 5. The extraction unit 42B, when extracting the data point of the local minimum value instead of extracting the data point of the local maximum value, inverts the sign of the extracted data point.

The noise determination unit 44A determines, as noise, a data point that does not correspond to the peak position of the cycle of the sine wave signal among the data points extracted by the extraction unit 42B. The AE sensor 3 outputs the sine wave signal of the AE wave, the number of data points extracted as one cycle of the sine wave from the digital data of the sine wave signal of the AE wave is known, and the position of the data point first extracted in the cycle is known. Therefore, it is possible to specify a position corresponding to the peak of the cycle of the sine wave on the basis of the number of data points extracted in one cycle and the position of the data point extracted first in the cycle. Information indicating the position corresponding to the peak is preset in the noise determination unit 44A.

Furthermore, the noise determination unit 44A determines, as noise, a data point that does not correspond to the peak position of the cycle among data points at each of which the increasing or decreasing trend between the data point and the data point extracted immediately before and the increasing or decreasing trend between the data point and the data point extracted immediately after are inverted. For example, a data point having a larger value than the data points extracted immediately before and immediately after tends to increase from the data point extracted immediately before, but tends to decrease to the data point extracted immediately after. In addition, a data point having a smaller value than the data points extracted immediately before and immediately after tends to decrease from the data point extracted immediately before, but tends to increase to the data point extracted immediately after. When these data points do not correspond to peak positions, the noise determination unit 44A determines that these data points are noise.

The noise removal unit 45A removes a data point determined as noise for each cycle of the sine wave signal of the AE wave. For example, the noise removal unit 45A removes a data point that does not correspond to the peak position of the cycle among the data points of the local maximum value or the local minimum value extracted by the extraction unit 42B. In addition, the noise removal unit 45A removes a data point that does not correspond to the peak position of the cycle among the data points at each of which the increasing or decreasing trend between the data point and the data point extracted immediately before and the increasing or decreasing trend between the data point and the data point extracted immediately after are inverted. Furthermore, the noise removal unit 45A may remove all data points of a cycle including noise.

Figure 11:
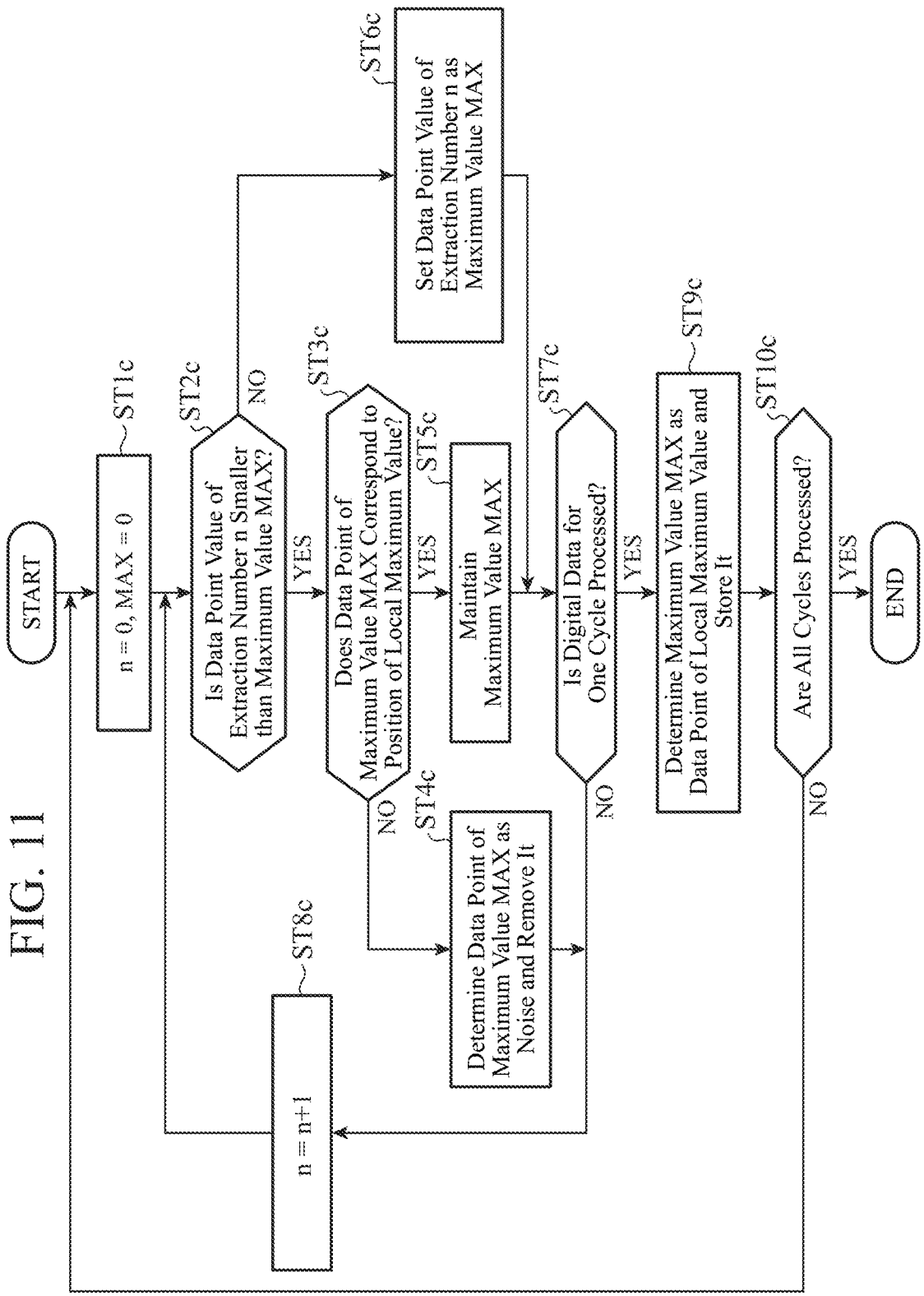
FIG. 11 is a flowchart showing a vibration detection method according to the third embodiment.

Next, an example of processing of extracting a data point of a local maximum value while removing noise for each cycle will be described. FIG. 11 is a flowchart illustrating a vibration detection method according to the third embodiment, and illustrates an example of processing performed by the extraction unit 42B. Processing in steps ST1c and ST2c in FIG. 11 is similar to processing in steps ST1a and ST2a in FIG. 5, and processing in steps ST5c to ST10c in FIG. 11 is similar to processing in steps ST3a to ST8a in FIG. 5, and thus, description thereof is omitted. In addition, n is an extraction number indicating an extraction order of a data point, and is a natural number of 0 or more. MAX is a maximum value of the data point.

Figure 12:
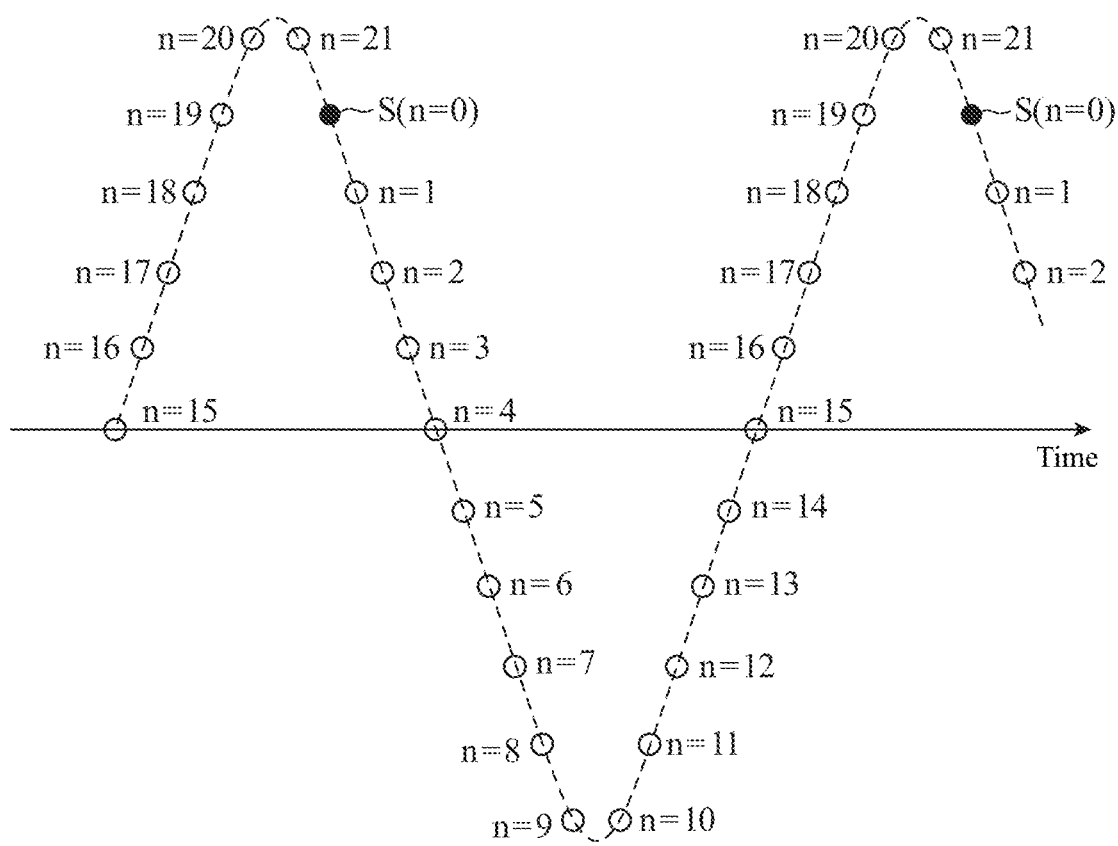
FIG. 12 is a diagram illustrating an outline of processing of extracting a data point of a local maximum value from digital data of a sine wave signal of an AE wave.

If the value of the data point with the extraction number n is smaller than the maximum value MAX (step ST2c; YES), the noise determination unit 44A checks whether or not the data point of the maximum value MAX corresponds to the peak position of the cycle (step ST3c). FIG. 12 is a diagram illustrating an outline of processing of extracting the data point of the local maximum value from the digital data of the sine wave signal of the AE wave, and illustrates processing of searching for the data point of the local maximum value while extracting 21 data points in order subsequent to a data point S as the data point of one cycle of the sine wave.

The data point S is the data point first extracted in the cycle, and the extraction number n is 0. In addition, the data point S is at a position in the vicinity temporally advanced from the peak position of the previous cycle. At this time, the peak position on the plus side of the sine wave is at a position corresponding to the number of data points extracted subsequent to the data point S±1. For example, in FIG. 12, since 21 data points up to a data point with an extraction number n of 21 are extracted subsequent to the data point S with an extraction number n of 0, the peak position corresponds to a range in which the number of extracted data points is 21±1, that is, the number of data points is 20 to 22.

When the data point of the maximum value MAX does not correspond to the peak position (step ST3c; NO), the noise determination unit 44A determines the data point of the maximum value MAX as noise, and notifies the noise removal unit 45A of this determination result. The noise removal unit 45A removes the data point of the maximum value MAX on the basis of the determination result notified from the noise determination unit 44A (step ST4c). Thereafter, the process proceeds to step ST8c, and the series of processing from step ST1c is performed on the data point with the next extraction number, so that the search for the data point of the local maximum value is continued.

On the other hand, when the data point of the maximum value MAX corresponds to the peak position (step ST3c; YES), the noise determination unit 44A determines that the data point of the maximum value MAX is not noise, and proceeds to the processing of step ST5c. As described above, since the extraction unit 42B extracts the data point of the local maximum value from the digital data from which the noise has been removed for each cycle, erroneous noise extraction is reduced.

Note that the noise removal unit 45A may remove all data points of one cycle including a data point determined to be noise by the noise determination unit 44A. In this case, since the extraction unit 42B extracts the data point of the local maximum value from the digital data from which the data point of the cycle including the noise has been removed, erroneous noise extraction is reduced.

Note that, in the case of extracting the data point of the local minimum value in FIG. 11, for example, the minimum value MIN is set instead of the maximum value MAX. The extraction unit 42B checks whether or not the value of the data point with the extraction number n is larger than the minimum value MIN (step ST2c). If the value of the data point with the extraction number n is larger than the minimum value MIN (step ST2c; YES), the process proceeds to step ST3c, and if the value of the data point with the extraction number n is equal to or less than the minimum value MIN (step ST2c; NO), the process proceeds to step ST6c. The noise determination unit 44A checks whether or not the data point of the minimum value MIN corresponds to the peak position (step ST3c). If the data point of the minimum value MIN does not correspond to the peak position (step ST3c; NO), the process proceeds to step ST4c, and if the data point of the minimum value MIN corresponds to the peak position (step ST3c; YES), the process proceeds to step ST5c. The processing in steps ST4c, ST5c, and ST6c is performed on the minimum value MIN. The extraction unit 42B determines the minimum value MIN as a data point of the local minimum value, inverts the sign of the minimum value MIN, and then stores the data point in the memory (step ST9c).

Figure 13:
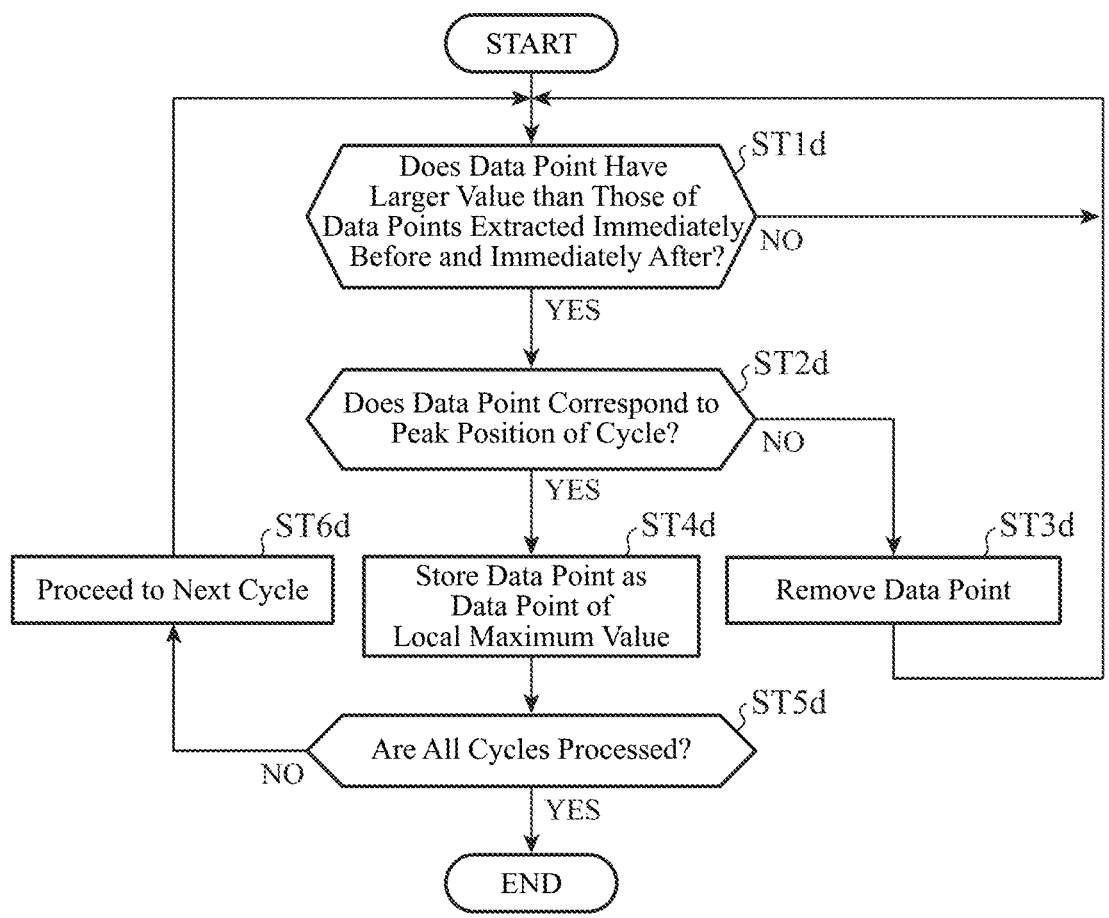
FIG. 13 is a flowchart illustrating another example of the vibration detection method according to the third embodiment.

FIG. 13 is a flowchart illustrating another example of the vibration detection method according to the third embodiment, and illustrates processing of searching for a data point of a local maximum value from data points having values larger than those of data points extracted immediately before and immediately after. The noise determination unit 44A extracts three consecutive data points (extraction number n=M−1, M, M+1) from digital data of one cycle of a sine wave, and checks whether or not an intermediate data point (extraction number n=M) has a value larger than those of the data points extracted immediately before and immediately after (extraction number n=M−1, M+1) (step ST1d).

In a case where the data point has a value larger than those of the data points extracted immediately before and immediately after (step ST1d; YES), the noise determination unit 44A checks whether or not it is a data point corresponding to the peak position of the cycle (step ST2d). The noise determination unit 44A determines whether or not it corresponds to a peak position by processing similar to that in step ST3c of FIG. 11.

When the data point (extraction number n=M) does not correspond to the peak position (step ST2d; NO), the noise determination unit 44A determines that the data point is noise and notifies the noise removal unit 45A of the determination result. The noise removal unit 45A removes the data point on the basis of the determination result notified from the noise determination unit 44A (step ST3d). Thereafter, among the digital data of the sine wave signal of the AE wave, the processing from step ST1d is performed on the next three consecutive data points (extraction number n=M+1, M+2, M+3), and the search for the data point of the local maximum value is continued.

When the data point (extraction number n=M) corresponds to the peak position (step ST2d; YES), the noise determination unit 44A determines that the data point is not noise and notifies the extraction unit 42B of the determination result. The extraction unit 42B determines the data point as the data point of the local maximum value of the current cycle on the basis of the determination result of the noise determination unit 44A and stores the data point in the memory (step ST4d).

Note that the noise removal unit 45A may remove all data points of one cycle including a data point determined to be noise by the noise determination unit 44A. In this case, since the extraction unit 42B extracts the data point of the local maximum value from the digital data from which the data point of the cycle including the noise has been removed, erroneous noise extraction is reduced.

Subsequently, the extraction unit 42B checks whether or not all the cycles of the sine wave signal of the AE wave have been processed (step ST5d). The extraction unit 42B checks whether or not the above-described processing has been performed for all cycles of the sine wave signal of the AE wave detected by the AE sensor 3 in a certain detection period (for example, a processing period of the workpiece by the machine tool).

If there is an unprocessed cycle (step ST5d; NO), the extraction unit 42B proceeds to the next cycle (step ST6d). That is, the extraction unit 42B sets the next cycle as the cycle to be searched for the local maximum value, thereby performing the processing from step ST1d on the cycle.

On the other hand, when all the cycles in the digital data of the sine wave signal of the AE wave have been processed (step ST5d; YES), the extraction unit 42B ends the processing of FIG. 13. Thereafter, the extraction unit 42B reads the data point of the local maximum value for each cycle from the memory, and outputs data of the read data point to the abnormality determination unit 5.

Note that, when extracting a data point of a local minimum value in FIG. 13, the noise determination unit 44A checks whether or not an intermediate data point (extraction number n=M) has a value smaller than those of the data points extracted immediately before and immediately after (extraction number n=M−1, M+1) (step ST1d). Furthermore, the noise determination unit 44A checks whether or not the data point corresponds to the peak position on the minus side of the sine wave (step ST2d). The extraction unit 42B determines the data point as a data point of a local minimum value, inverts the sign of the data point, and then stores the data point in the memory (step ST4d).

The functions of the A/D conversion unit 41 and the extraction unit 42B in the vibration detection device 4B are implemented by a processing circuit. That is, the vibration detection device 4B includes a processing circuit for executing the processing illustrated in FIG. 11 or 13. The processing circuit may be the processing circuit 102 of dedicated hardware shown in FIG. 7A or the processor 103 that executes programs stored in the memory 104 shown in FIG. 7B.

As described above, the vibration detection device 4B according to the third embodiment includes the A/D conversion unit 41 and the extraction unit 42B. The extraction unit 42B includes the noise determination unit 44A and the noise removal unit 45A. The noise determination unit 44A determines, as noise, a data point that does not correspond to the peak position of the cycle of the sine wave signal among the data points extracted by the extraction unit 42B. In addition, the noise determination unit 44A determines, as noise, a data point that does not correspond to the peak position of the cycle of the sine wave signal among the data points at each of which the increasing or decreasing trend between the data point and the data point extracted immediately before and the increasing or decreasing trend between the data point and the data point extracted immediately after are inverted. The noise removal unit 45A removes noise included in the cycle of the sine wave signal. The extraction unit 42B extracts a data point of a local maximum value or a local minimum value from the data points of the cycle from which the noise has been removed. Since noise is removed every cycle, erroneous noise extraction can be reduced.

Fourth Embodiment

Figure 14:
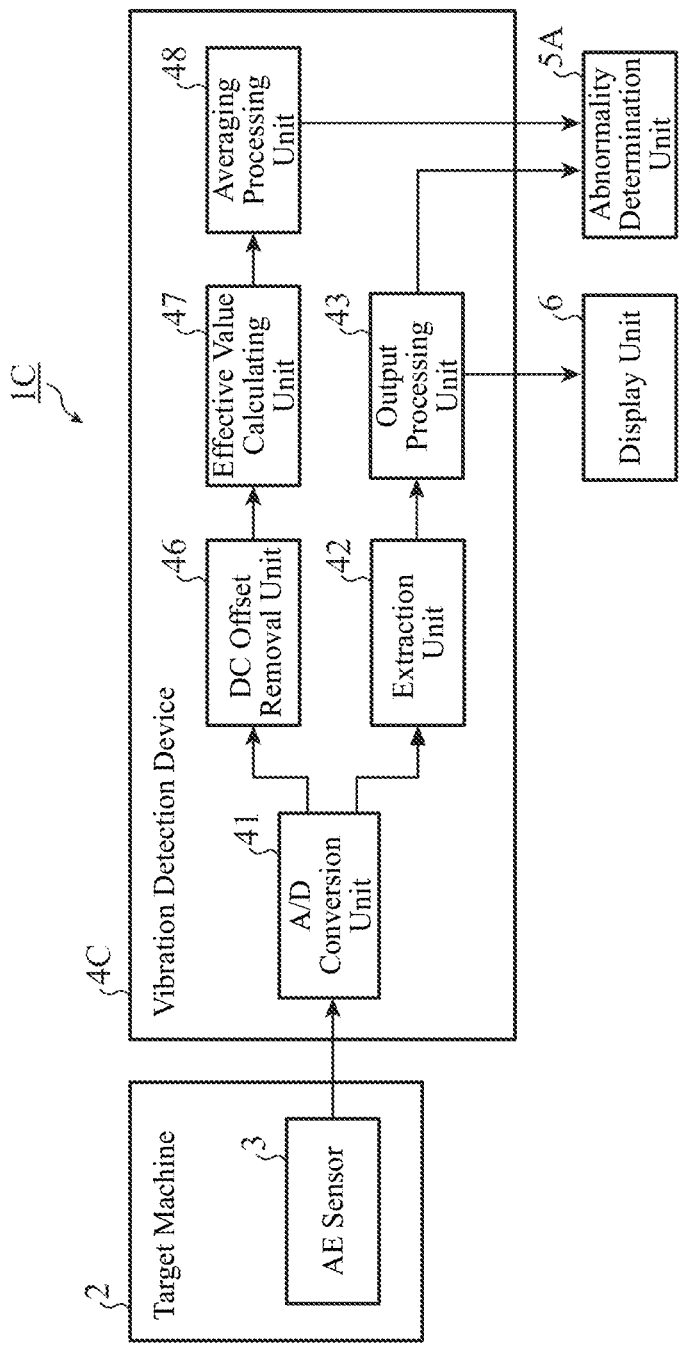
FIG. 14 is a block diagram showing a configuration of an abnormality determination system according to a fourth embodiment.

FIG. 14 is a block diagram showing a configuration of an abnormality determination system 1C according to the fourth embodiment. In FIG. 14, the same components as those in FIG. 1 are designated by the same reference numerals, and the description thereof will be omitted. The abnormality determination system 1C is a system that determines the presence or absence of an abnormality of the target machine 2 on the basis of vibration generated in the target machine 2, and includes an AE sensor 3, a vibration detection device 4C, and an abnormality determination unit 5A. The vibration detection device 4C includes a DC offset removal unit 46, an effective value calculating unit 47, and an averaging processing unit 48 in addition to an A/D conversion unit 41, an extraction unit 42, and an output processing unit 43.

The DC offset removal unit 46 removes the DC offset from the digital data of the sine wave signal of the AE wave. For example, the DC offset removal unit 46 calculates an average value of the digital data for a certain period of time, specifies the DC offset using the calculated average value, and removes the specified DC offset.

The effective value calculating unit 47 calculates the effective value of the digital data of the sine wave signal from which the DC offset has been removed. The effective value is an evaluation value for evaluating the magnitude of the sine wave signal that changes with time, and is, for example, a value obtained by averaging the square of the value of the data point of the digital data of the sine wave signal for one cycle of the sine wave signal and taking the square root of the value.

The averaging processing unit 48 performs averaging processing on the effective value calculated by the effective value calculating unit 47 to calculate an average value. This average value is a numerical value of the vibration level of the target machine 2. For example, the averaging processing unit 48 calculates an average value of the effective values accumulated until the previous measurement. The average value is based on the sine wave signal of the AE wave corresponding to the vibration generated in the target machine 2, and is a value indicating the vibration level of the target machine 2.

Note that the method of averaging the effective values of the sine wave signals in order to quantify the vibration level is an example, and any other method may be used as long as the vibration level can be quantified on the basis of the sine wave signal of the AE wave. For example, the effective value itself of the sine wave signal may be quantified as the vibration level, or the period integrated value of the effective value of the sine wave signal may be quantified as the vibration level.

The abnormality determination unit 5A determines an abnormality of the target machine 2 on the basis of the data output from the output processing unit 43 similarly to the first embodiment. That is, the abnormality determination unit 5A determines a sudden abnormality generated in the target machine 2 on the basis of the data point of the local maximum value extracted from the digital data of the sine wave signal of the AE wave. For example, when the target machine 2 is a cutting device, damage (nick in the blade) of the cutting blade is determined.

Further, the abnormality determination unit 5A determines the deterioration state of the target machine 2 on the basis of the average value calculated by the averaging processing unit. For example, the abnormality determination unit 5A sets the average value of the effective values of the vibration levels of the target machine 2 obtained within a certain period as the initial value, and then, determines that the target machine 2 tends to deteriorate when the average value of the effective values of the vibration levels obtained from the target machine 2 has a significant change from the initial value.

Note that, the abnormality determination unit 5A may analyze the deterioration trend of the target machine 2 and predict the life of the target machine 2 on the basis of the analysis result. As described above, the abnormality determination unit 5A can monitor deterioration (for example, abrasion of the cutting blade) that progresses slowly in the target machine 2 on the basis of the average value of the effective values of the vibration levels in the target machine 2 calculated by the averaging processing unit 48.

Note that the vibration detection device 4C may include an extraction unit 42A instead of the extraction unit 42, and may further include a noise determination unit 44 and a noise removal unit 45. In addition, the vibration detection device 4C may include an extraction unit 42B instead of the extraction unit 42. Furthermore, the abnormality determination system 1C may include a vibration detection device including the A/D conversion unit 41, the extraction unit 42, and the output processing unit 43, and a vibration detection device including the A/D conversion unit 41, the DC offset removal unit 46, the effective value calculating unit 47, and the averaging processing unit 48.

As described above, in the abnormality determination system 1C according to the fourth embodiment, it is possible to simultaneously determine an abnormality that occurs suddenly in the target machine 2 and monitor a deterioration state that progresses slowly in the target machine 2.

Fifth Embodiment

Figure 15A:
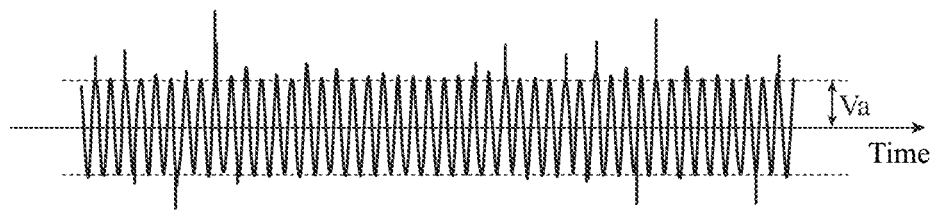
FIG. 15A is a waveform diagram illustrating an output waveform of an AE sensor that has detected an AE wave caused by vibration continuously generated in a target machine.
Figure 15B:
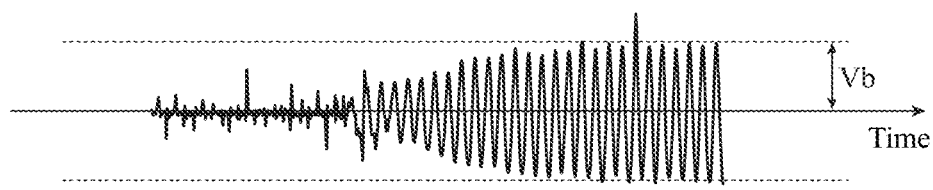
FIG. 15B is a waveform diagram illustrating an output waveform of the AE sensor that has detected an AE wave caused by vibration suddenly generated in the target machine.
Figure 15C:
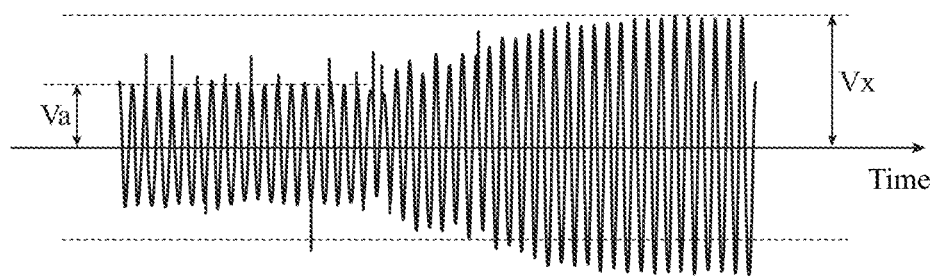
FIG. 15C is a waveform diagram illustrating an example (1) of an output waveform of the AE sensor that has detected an AE wave caused by vibration continuously generated and vibration suddenly generated in the target machine.
Figure 15D:
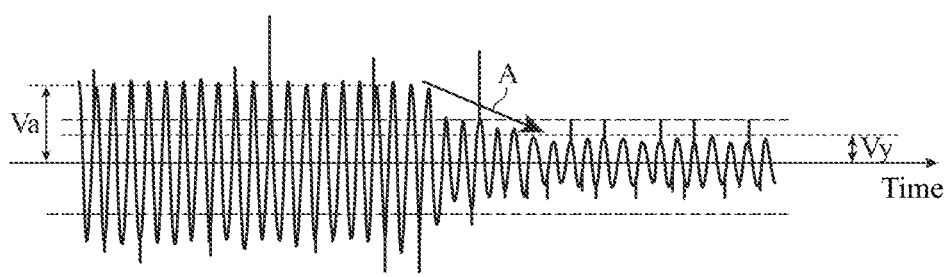
FIG. 15D is a waveform diagram illustrating an example (2) of an output waveform of the AE sensor that has detected an AE wave caused by vibration continuously generated and vibration suddenly generated in the target machine.
Figure 15E:
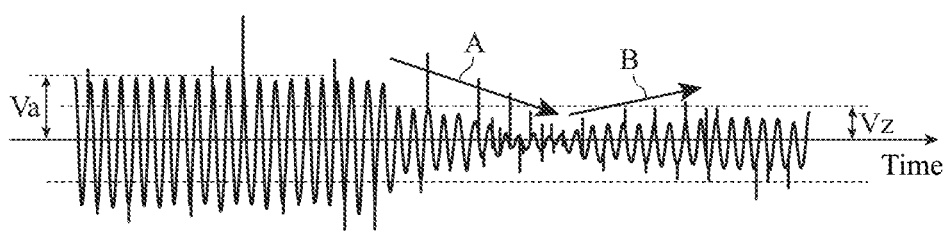
FIG. 15E is a waveform diagram illustrating an example (3) of an output waveform of the AE sensor that has detected an AE wave caused by vibration continuously generated and vibration suddenly generated in the target machine.

FIG. 15A is a waveform diagram illustrating an output waveform of the AE sensor 3 that has detected an AE wave caused by vibration continuously generated in the target machine 2. FIG. 15B is a waveform diagram illustrating an output waveform of the AE sensor 3 that has detected the AE wave caused by vibration suddenly generated in the target machine 2. FIG. 15C is a waveform diagram illustrating an example (1) of an output waveform of the AE sensor 3 that has detected the AE wave caused by the vibration continuously generated and the vibration suddenly generated in the target machine 2. FIG. 15D is a waveform diagram illustrating an example (2) of an output waveform of the AE sensor 3 that has detected the AE wave caused by the vibration continuously generated and the vibration suddenly generated in the target machine 2. FIG. 15E is a waveform diagram illustrating an example (3) of an output waveform of the AE sensor that has detected the AE wave caused by the vibration continuously generated and the vibration suddenly generated in the target machine.

For example, in a case where the target machine 2 is a rotary machine, continuous vibration is generated in the rotary machine when the rotary shaft rotates. Since the vibration is an impact applied to the rotary machine, a continuous AE wave caused by a continuous impact is generated in the rotary machine. The continuous AE wave generated in the rotary machine is detected as a sine wave signal by the AE sensor 3 as illustrated in FIG. 15A. In FIG. 15A, Va is an average value of N-cycle peak values of the sine wave signal of the AE wave caused by vibrations continuously generated in the target machine 2.

When an abnormality occurs in the bearing of the rotary shaft, vibration caused by the abnormality of the bearing is generated in the rotary machine, and an AE wave caused by the vibration is generated. The AE wave caused by the abnormality of the bearing of the rotary machine is detected as a sine wave signal by the AE sensor 3 as illustrated in FIG. 15B. Vb is an average value of peak values for N cycles of the sine wave signal caused by the vibration suddenly generated in the target machine 2.

In a case where a sudden abnormality occurs in the bearing of the rotating shaft while the rotary shaft of the rotary machine rotates, when continuous vibration is generated due to the rotation of the rotary shaft, vibration caused by the sudden abnormality generated in the bearing is also generated in the rotary machine, and an AE wave caused by these vibrations is generated. For this reason, in the rotary machine, in a period in which the sudden vibration is generated, a sine wave signal of an AE wave in which an AE wave caused by continuously generated vibration and an AE wave caused by suddenly generated vibration are mutually intensified may be generated.

For example, as illustrated in FIG. 15C, when an average value of N-cycle peak values of the sine wave signal of the AE wave in which an AE wave caused by continuously generated vibration and an AE wave caused by suddenly generated vibration are mutually intensified is Vx, a change amount Vc of the sine wave signal value of the AE wave caused by suddenly generated vibration is a value obtained by subtracting Va from Vx (Vc=Vx−Va). The conventional vibration detection device detects such an increase in the signal value of the AE wave and detects the generation of sudden vibration in the target machine.

However, actually, the signal value of the AE wave may decrease in a period in which the sudden vibration is generated in the target machine. For example, when the AE wave caused by the continuously generated vibration and the AE wave caused by the suddenly generated vibration are mutually weakened, the signal value of the AE wave caused by the continuous vibration generated in the rotary machine decreases as indicated by an arrow A in FIG. 15D. When an average value of N-cycle peak values of the sine wave signal of the AE wave in which the AE wave caused by the continuously generated vibration and the AE wave caused by the suddenly generated vibration are mutually weakened is Vy, a change amount Vd of the sine wave signal value of the AE wave caused by the suddenly generated vibration is a value obtained by subtracting Vy from Va (Vd=Va−Vy).

In addition, in a case where the above two are mutually weakened, when the AE wave caused by the suddenly generated vibration is larger than the AE wave caused by the continuously generated vibration, the signal value of the AE wave decreases as indicated by an arrow A in FIG. 15E, and then increases to a value of a difference between the signal value of the AE wave caused by the continuously generated vibration and the signal value of the AE wave caused by the suddenly generated vibration as indicated by an arrow B. Vz is an average value of N-cycle peak values of a sine wave signal of an AE wave in which an AE wave caused by continuously generated vibration and an AE wave caused by suddenly generated vibration are mutually weakened. The change amount Vd of the sine wave signal value of the AE wave caused by the suddenly generated vibration is a value (Vd=Vz+Va) obtained by adding Vz and Va. Note that, in a case where the AE wave caused by the continuously generated vibration and the AE wave caused by the suddenly generated vibration are completely intensified mutually or completely weakened mutually, Vd=Vb.

For example, in an etching apparatus used for manufacturing a semiconductor element, a refrigerant is usually supplied to a cooling pipe disposed in a wall surface of a vacuum chamber to cool the wall surface. In the etching apparatus, continuous vibration is generated by supply of the refrigerant to the cooling pipe. When etching of the workpiece disposed in the vacuum chamber is started, vibration occurs in the etching apparatus due to the etching process. That is, in the etching apparatus, sudden vibration is generated by etching of the workpiece in a state where vibration is continuously generated by cooling of the wall surface of the vacuum chamber.

An AE wave caused by vibration generated by etching of a workpiece usually has a signal value smaller than that of an AE wave caused by vibration continuously generated by cooling of a wall surface of a vacuum chamber. For this reason, the AE wave caused by the continuously generated vibration and the AE wave caused by the suddenly generated vibration may be mutually weakened. In this case, the conventional vibration detection device cannot detect vibration suddenly generated in the target machine.

Therefore, in the vibration detection device according to the fifth embodiment, it is determined which change trend of a stable trend, an increasing trend, a decreasing trend, or a change trend turning from decreasing to increasing the sine wave signal value of the AE wave generated in the target machine 2 has. As a result, the vibration detection device according to the fifth embodiment can detect the suddenly generated vibration even when the AE wave caused by the vibration continuously generated in the target machine and the AE wave caused by the suddenly generated vibration are mutually weakened.

Figure 16:
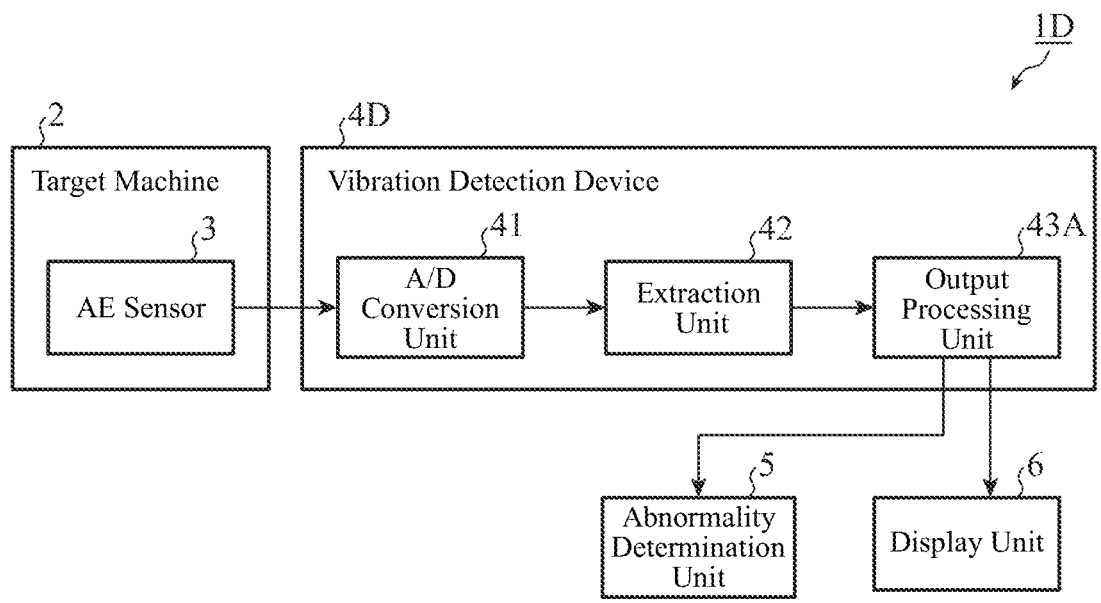
FIG. 16 is a block diagram showing a configuration of an abnormality determination system according to a fifth embodiment.

FIG. 16 is a block diagram showing a configuration of an abnormality determination system 1D according to the fifth embodiment. In FIG. 16, the same components as those in FIG. 1 are designated by the same reference numerals, and the description thereof will be omitted. The abnormality determination system 1D is a system that determines the presence or absence of an abnormality of the target machine 2 on the basis of vibration generated in the target machine 2, and includes an AE sensor 3, a vibration detection device 4D, an abnormality determination unit 5, and a display unit 6. The abnormality determination unit 5 and the display unit 6 may be provided in an external device disposed separately from the vibration detection device 4D, or may be provided in the vibration detection device 4D.

The vibration detection device 4D uses data points for each of a plurality of cycles of the sine wave signal of the AE wave detected from the target machine 2 by the AE sensor 3 to determine which change trend of a stable trend, an increasing trend, a decreasing trend, or a change trend turning from decreasing to increasing the sine wave signal of the AE wave has, calculates a change amount of the sine wave signal of the AE wave that is changed with the determined change trend, and outputs a change amount corresponding to the change trend of the sine wave signal of the AE wave. As illustrated in FIG. 16, the vibration detection device 4D includes, for example, an A/D conversion unit 41, an extraction unit 42, and an output processing unit 43A.

Figure 17:
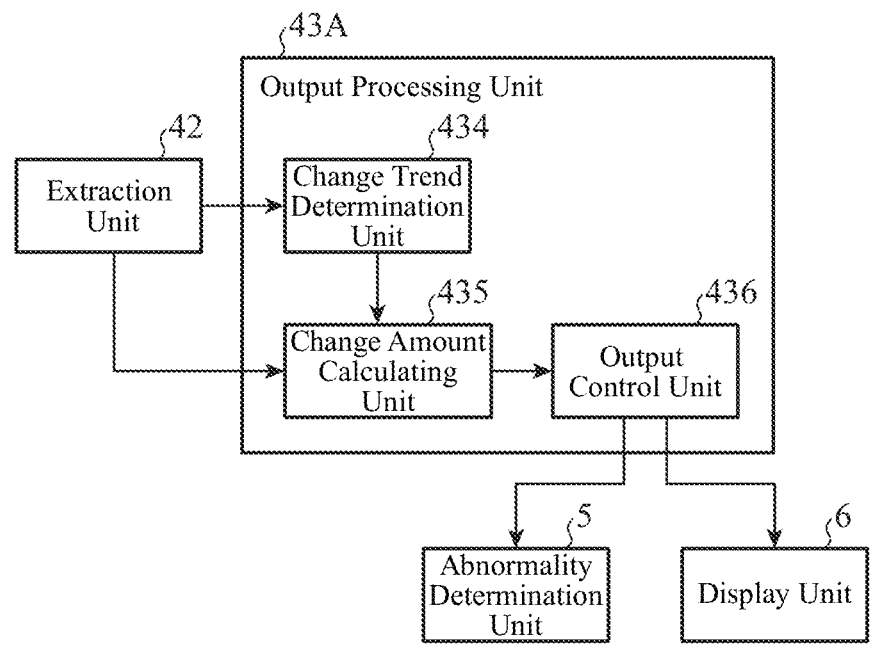
FIG. 17 is a block diagram illustrating a configuration of an output processing unit in FIG. 16.

FIG. 17 is a block diagram illustrating a configuration of the output processing unit 43A in FIG. 16. As illustrated in FIG. 17, the output processing unit 43A includes a change trend determination unit 434, a change amount calculating unit 435, and an output control unit 436. The change trend determination unit 434 uses the data point of the local maximum value every the plurality of cycles of the sine wave signal of the AE wave extracted by the extraction unit 42 to determine which change trend of a stable trend, an increasing trend, a decreasing trend, or a change trend turning from decreasing to increasing the sine wave signal of the AE wave has. The change amount calculating unit 435 calculates a change amount in the sine wave signal value of the AE wave that is changed with the determined change trend. The output control unit 436 outputs a change amount corresponding to the change trend of the sine wave signal of the AE wave to the abnormality determination unit 5 or the display unit 6.

Figure 18:
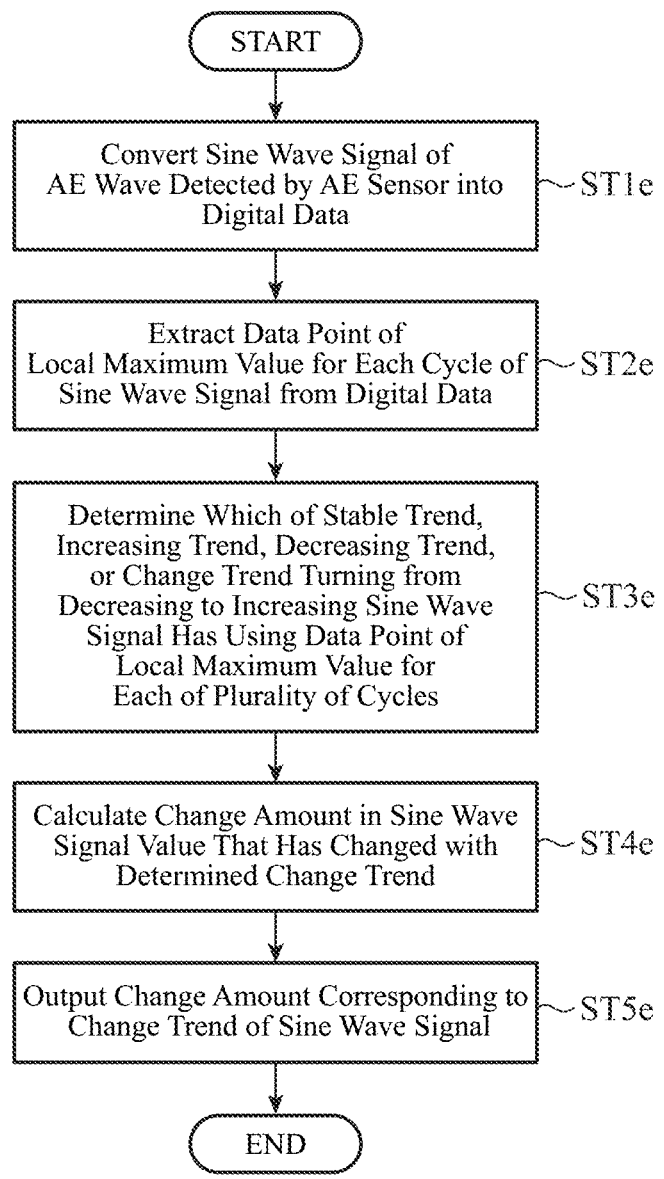
FIG. 18 is a flowchart showing a vibration detection method according to the fifth embodiment.

FIG. 18 is a flowchart illustrating a vibration detection method according to the fifth embodiment, and illustrates a series of operations by the vibration detection device 4D. The AE sensor 3 detects an AE wave corresponding to vibration generated in the target machine 2. The A/D conversion unit 41 receives the sine wave signal of the AE wave detected by the AE sensor 3, and converts the received sine wave signal of the AE wave into digital data (step ST1*e*).

The extraction unit 42 receives the digital data converted by the A/D conversion unit 41, and extracts a data point of a local maximum value for each cycle of the sine wave signal from the received digital data (step ST2*e*). For example, the extraction unit 42 extracts the data point of the local maximum value for each cycle of the sine wave signal from the digital data of the sine wave signal of the AE wave, and outputs the extracted data point of the local maximum value to the output processing unit 43A.

Subsequently, the change trend determination unit 434 uses the data point of the local maximum value every N cycles of the sine wave signal of the AE wave extracted by the extraction unit 42 to determine which change trend of a stable trend, an increasing trend, a decreasing trend, or a change trend turning from decreasing to increasing the sine wave signal of the AE wave has (step ST3*e*). N is an integer of 2 or more. The change amount calculating unit 435 calculates the change amount in the sine wave signal value of the AE wave that is changed with the change trend determined by the change trend determination unit 434 (step ST4*e*).

The output control unit 436 outputs the change amount corresponding to the change trend of the sine wave signal of the AE wave calculated by the change amount calculating unit 435 to the abnormality determination unit 5 or the display unit 6 (step ST5*e*). For example, the abnormality determination unit 5 compares the allowable output range of the AE sensor 3 when the target machine 2 is in the normal state with the change amount corresponding to the change trend of the sine wave signal of the AE wave. Then, when the change amount corresponding to the change trend of the sine wave signal of the AE wave is out of the allowable output range, the abnormality determination unit 5 determines that a sudden abnormality has occurred in the target machine 2. The allowable output range is preset in the abnormality determination unit 5. In addition, the allowable output range of the AE sensor 3 may be updated in accordance with the degree of deterioration of the target machine 2.

In addition, the abnormality determination unit 5 may compare a stable duration in which the stable trend of the output value of the AE sensor 3 is maintained in the target machine 2 in the normal state with the time in which the sine wave signal of the AE wave tends to be stable, and determine that a sudden abnormality has occurred in the target machine 2 when the time in which the sine wave signal of the AE wave tends to be stable is less than the stable duration.

The output control unit 436 displays, on the display unit 6, the cycle data of the sine wave signal of the AE wave of consecutive N cycles, the change trend of the sine wave signal of the AE wave determined by the change trend determination unit 434, and the change amount of the value of the sine wave signal of the AE wave that is changed with this change trend. A maintenance worker of the target machine 2 can easily visually recognize whether the cycle data is the detected data of the vibration of the target machine 2 or the noise by referring to the display content of the display unit 6. That is, the vibration detection device 4D can reduce the signal processing necessary for analyzing the temporal change trend of the vibration generated in the target machine 2, and can provide data that enables visual recognition of whether the cycle data is the detected data of the vibration of the target machine 2 or the noise.

Figure 19:
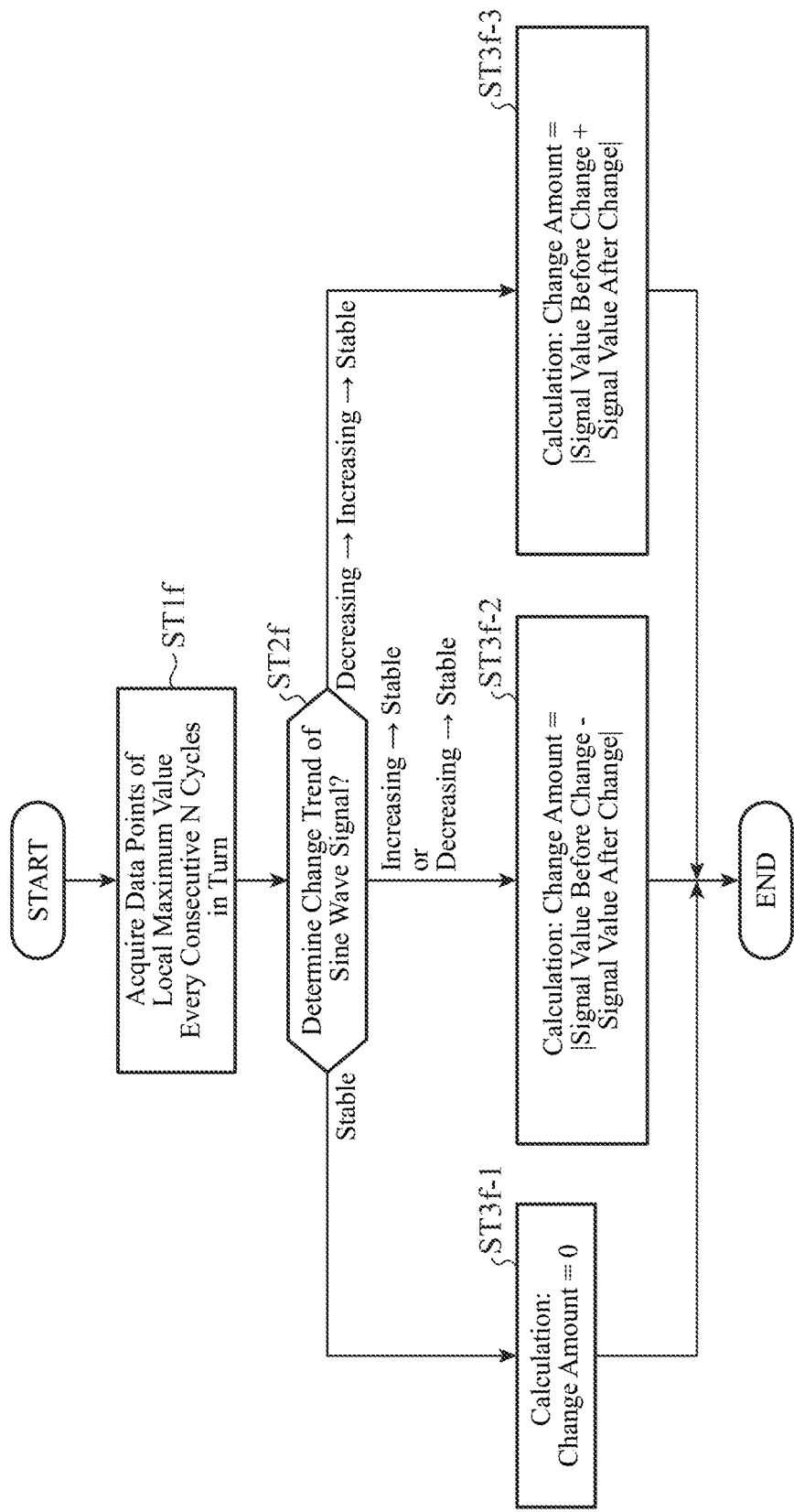
FIG. 19 is a flowchart illustrating detailed processing of steps ST3e and ST4e in FIG. 18.

FIG. 19 is a flowchart illustrating detailed processing of step ST3*e* and step ST4*e* of FIG. 18. The change trend determination unit 434 receives a data point of the maximum peak value (local maximum value) of the sine wave signal of the AE wave for each cycle extracted by the extraction unit 42, and stores the received data point in the memory. The change trend determination unit 434 acquires a plurality of data points of local maximum value every consecutive N cycles from the memory (step ST1*f*).

The change trend determination unit 434 determines a change trend of the sine wave signal of the AE wave using the plurality of acquired data points of the local maximum value (step ST2*f*). For example, the change trend determination unit 434 extracts a data point of a maximum value and a data point of a minimum value from a plurality of data points of a local maximum value every N cycles, and calculates a change width that is a difference between the data point of a maximum value and the data point of a minimum value. Then, the change trend determination unit 434 compares the calculated change width with the threshold value every N cycles, and determines the change trend of the sine wave signal of the AE wave on the basis of the comparison result.

FIG. 20 is a table illustrating determination criteria for a change trend of a sine wave signal of an AE wave. The change trend determination unit 434 may determine the change trend of the sine wave signal of the AE wave on the basis of the determination criterion table as illustrated in FIG. 20. For example, when the change width between the data point of a maximum value and the data point of a minimum value extracted from the plurality of data points of a local maximum value for the previous N cycles is within the set range, the change trend determination unit 434 temporarily determines that the sine wave signal of the AE wave in the previous N cycles has a stable trend. "Stable (provisional)" in the determination criterion table indicates that the change trend determination unit 434 provisionally determines that the sine wave signal of the AE wave has a stable trend.

In addition, in a case where the change width between the data point of a maximum value and the data point of a minimum value extracted from the plurality of data points of a local maximum value for the previous N cycles is a value deviating to a side larger than the set range, the change trend determination unit 434 temporarily determines that the sine wave signal of the AE wave in the previous N cycles has an increasing trend. "Increasing (provisional)" in the determination criterion table indicates that the change trend determination unit 434 provisionally determines that the sine wave signal of the AE wave has an increasing trend.

In a case where the change width between the data point of a maximum value and the data point of a minimum value extracted from the plurality of data points of a local maximum value for the previous N cycles is a value deviating to a side smaller than the set range, the change trend determination unit 434 temporarily determines that the sine wave signal of the AE wave in the previous N cycles has a decreasing trend. "Decrease (provisional)" in the determination criterion table indicates that the change trend determination unit 434 provisionally determines that the sine wave signal of the AE wave has a decreasing trend. "Decreasing→increasing (provisional)" indicates that the change trend determination unit 434 provisionally determines that the sine wave signal of the AE wave has a change trend turning from decreasing to increasing.

The change trend determination unit 434 compares the change width between the data point of a maximum value and the data point of a minimum value extracted from the plurality of data points of a local maximum value for the current N cycles with the set range, thereby temporarily determining whether the sine wave signal of the AE wave in the current N cycles has a stable trend, an increasing trend, or a decreasing trend. Subsequently, the change trend determination unit 434 determines a change trend corresponding to the change trend of the sine wave signal of the AE wave in the previous N cycles and the change trend of the sine wave signal of the AE wave in the current N cycles on the basis of the determination criterion table illustrated in FIG. 20.

For example, when temporarily determining that the sine wave signal of the AE wave in the previous N cycles has a stable trend and temporarily determining that the sine wave signal of the AE wave in the current N cycles has a stable trend, the change trend determination unit 434 determines that the sine wave signal of the AE wave has a stable trend. "Stable (determination)" in the determination criterion table indicates that the change trend determination unit 434 determines that the sine wave signal of the AE wave has a stable trend.

In a case where the change trend determination unit 434 temporarily determines that the sine wave signal of the AE wave in the previous N cycles has an increasing trend and temporarily determines that the sine wave signal of the AE wave in the current N cycles has a stable trend, the change trend determination unit determines that the sine wave signal of the AE wave has an increasing trend. "Increasing (determination)" in the determination criterion table indicates that the change trend determination unit 434 determines that the sine wave signal of the AE wave has an increasing trend.

When the change trend determination unit 434 temporarily determines that the sine wave signal of the AE wave in the previous N cycles has a decreasing trend and temporarily determines that the sine wave signal of the AE wave in the current N cycles has a stable trend, the change trend determination unit determines that the sine wave signal of the AE wave has a decreasing trend. "Decreasing (determination)" in the determination criterion table indicates that the change trend determination unit 434 determines that the sine wave signal of the AE wave has a decreasing trend.

In a case where the change trend determination unit 434 temporarily determines that the sine wave signal of the AE wave in the previous N cycles has a change trend turning from decreasing to increasing and temporarily determines that the sine wave signal of the AE wave in the current N cycles has a stable trend, the change trend determination unit 434 determines that the sine wave signal of the AE wave has a change trend turning from decreasing to increasing. "Decreasing→increasing (determination)" in the determination criterion table indicates that the change trend determination unit 434 determines that the sine wave signal of the AE wave has a change trend turning from decreasing to increasing.

Figure 21A:
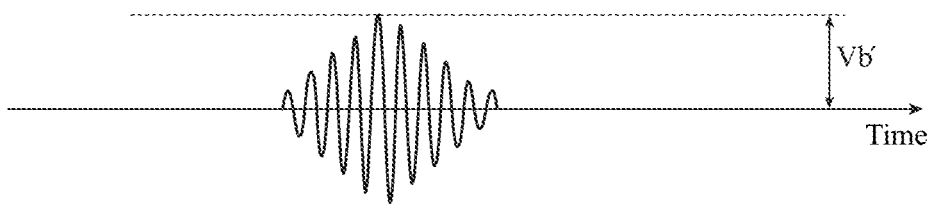
FIG. 21A is a waveform diagram illustrating an output waveform of an AE sensor that has detected an AE wave caused by vibration that is suddenly generated in a target machine and has a short duration.
Figure 21B:
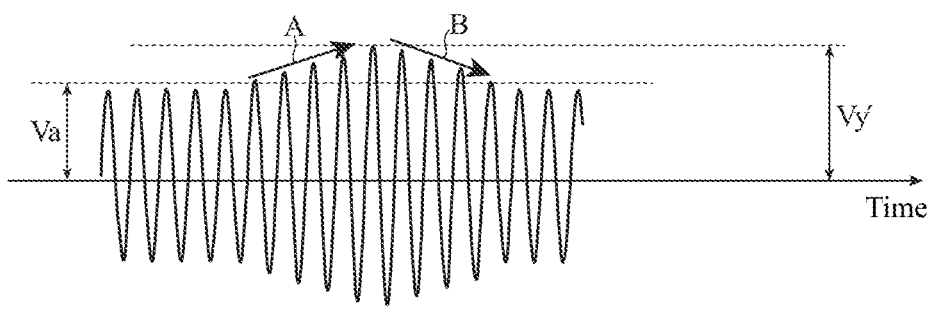
FIG. 21B is a waveform diagram illustrating an example (1) of an output waveform of the AE sensor that has detected an AE wave caused by vibration that is continuously generated in the target machine and vibration that is suddenly generated and has a short duration.
Figure 21C:
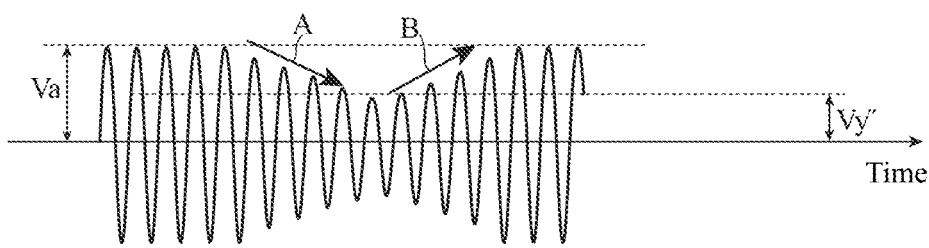
FIG. 21C is a waveform diagram illustrating an example (2) of an output waveform of the AE sensor that has detected an AE wave caused by vibration that is continuously generated in the target machine and vibration that is suddenly generated and has a short duration.
Figure 21D:
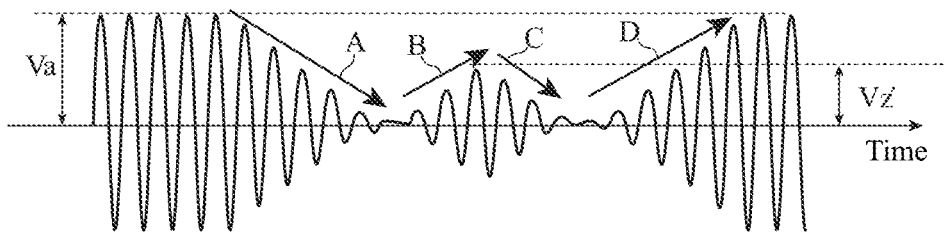
FIG. 21D is a waveform diagram illustrating an example (3) of an output waveform of the AE sensor that has detected an AE wave caused by vibration that is continuously generated in the target machine and vibration that is suddenly generated and has a short duration.
Figure 21E:
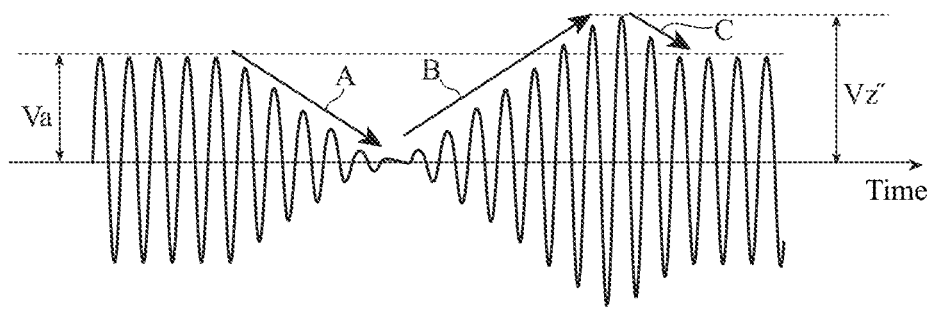
FIG. 21E is a waveform diagram illustrating an example (4) of an output waveform of the AE sensor that has detected an AE wave caused by vibration that is continuously generated in the target machine and vibration that is suddenly generated and has a short duration.

FIG. 21A is a waveform diagram illustrating an output waveform of the AE sensor 3 that has detected an AE wave caused by vibration that is suddenly generated in the target machine 2 and has a short duration. FIG. 21B is a waveform diagram illustrating an example (1) of an output waveform of the AE sensor 3 that has detected an AE wave caused by vibration continuously generated in the target machine 2 and vibration that is suddenly generated and has a short duration. FIG. 21C is a waveform diagram illustrating an example (2) of an output waveform of the AE sensor 3 that has detected an AE wave caused by vibration continuously generated in the target machine 2 and vibration that is suddenly generated and has a short duration. FIG. 21D is a waveform diagram illustrating an example (3) of an output waveform of the AE sensor 3 that has detected an AE wave caused by vibration continuously generated in the target machine 2 and vibration that is suddenly generated and has a short duration. FIG. 21E is a waveform diagram illustrating an example (4) of an output waveform of the AE sensor 3 that has detected an AE wave caused by vibration continuously generated in the target machine 2 and vibration that is suddenly generated and has a short duration.

When the duration of the vibration suddenly generated in the target machine 2 is short as illustrated in FIG. 21A, the vibration is small, and the output signal value of the AE sensor 3 that has detected the AE wave caused by the vibration and the AE wave caused by the continuous vibration does not reach a stable state as illustrated in FIGS. 21B to 21E and returns to the signal value of the AE wave caused by the continuous vibration. In FIG. 21A, Vb' is an average value of peak values for N cycles of the sine wave signal of the AE wave caused by the vibration that is suddenly generated and has a short duration. In FIG. 20, in a case where the previous time is increasing (provisional) and this time is decreasing (provisional), and in a case where the previous time is decreasing→increasing (provisional) and this time is decreasing (provisional), vibration that is suddenly generated and has a short duration as illustrated in FIG. 21A is generated in the target machine 2. Since the vibration is small, the detection is unnecessary, and the vibration is determined as noise in the determination criterion table illustrated in FIG. 20.

In the case of detecting an AE wave caused by vibration that is suddenly generated and has a short duration as illustrated in FIG. 21A, it is possible to calculate a change amount of a sine wave signal value of an AE wave caused by vibration that is suddenly generated and has a short duration by determining a change trend of increasing→decreasing as illustrated in FIG. 21B, a change trend of decreasing→increasing as illustrated in FIG. 21C, a change trend of decreasing→increasing→decreasing→increasing as illustrated in FIG. 21D, or a change trend of decreasing→increasing→decreasing as illustrated in FIG. 21E, in addition to the determination so far of change tendencies of stable, increasing, decreasing, and decreasing→increasing.

When the AE wave caused by the vibration that is suddenly generated and has a short duration and the AE wave caused by the vibration that is continuously generated are mutually intensified, as indicated by an arrow A in FIG. 21B, the signal value of the AE wave does not reach a stable state after increasing, but turns to decreasing as indicated by an arrow B, and decreases to the signal value (average value Va of peak values) of the AE wave caused by the continuous vibration. Vy' is an average value of N-cycle peak values of a sine wave signal of an AE wave in which an AE wave caused by continuously generated vibration and an AE wave caused by vibration that is suddenly generated and has a short duration are mutually intensified. The change amount Vd of the sine wave signal value of the AE wave caused by the vibration that is suddenly generated and has a short duration is a value obtained by subtracting Va from Vy' (Vd=Vy'−Va).

In a case where an AE wave caused by continuously generated vibration and an AE wave caused by vibration that is suddenly generated and has a short duration are mutually weakened, when an average value of N-cycle peak values of a sine wave signal of the AE wave is Vy" and Vb' is equal to or less than Va, the signal value of the AE wave decreases as indicated by an arrow A in FIG. 21C, then does not reach a stable state, but turns to increasing as indicated by an arrow B, and increases to a signal value (average value Va of peak values) of the AE wave caused by continuous vibration. In this case, the change amount Vd of the sine wave signal value of the AE wave caused by the vibration that is suddenly generated and has a short duration is a value obtained by subtracting Vy″ from Va (Vd=Va−Vy″).

In addition, in a case where Vb′ is larger than Va and is two times or less than Va, the signal value of the AE wave decreases as indicated by an arrow A in FIG. 21D, then does not reach a stable state, increases as indicated by an arrow B, further turns to decreasing as indicated by an arrow C, and then increases to the signal value (average value Va of peak values) of the AE wave caused by continuous vibration as indicated by an arrow D. When the average value of the N-cycle peak values of the sine wave signal of the AE wave changing in this manner is Vz′, the change amount Vd of the sine wave signal value of the AE wave caused by the vibration that is suddenly generated and has a short duration is a value obtained by adding Vz′ to Va (Vd=Va+Vz′).

Furthermore, when Vb′ is larger than 2 times Va, the signal value of the AE wave does not reach a stable state after exceeding Va as indicated by an arrow B in FIG. 21E, and decreases to the signal value (average value Va of peak values) of the AE wave caused by continuous vibration as indicated by an arrow C. When the average value of the N-cycle peak values of the sine wave signal of the AE wave changing in this manner is Vz″, the change amount Vd of the sine wave signal value of the AE wave caused by the vibration that is suddenly generated and has a short duration is a value obtained by adding Vz″ to Va (Vd=Va+Vz″).

When the change trend determination unit 434 determines that the sine wave signal of the AE wave has a stable trend (step ST2f; Stable), the change amount calculating unit 435 sets a value indicating output stability as the change amount of the sine wave signal value of the AE wave (step ST3f-1). The value indicating the output stability may be any value indicating a state in which the sine wave signal value of the AE wave changes in a substantially constant range, and is, for example, 0. In FIG. 19, the change amount calculating unit 435 sets the change amount=0.

When the change trend determination unit 434 determines that the sine wave signal value of the AE wave has stabilized from the increasing trend (step ST2f; increasing→stable), or determines that the sine wave signal value of the AE wave has stabilized from the decreasing trend (step ST2f; decreasing→stable), the change amount calculating unit 435 calculates, as a change amount, an absolute value of a difference between the sine wave signal value of the AE wave before the change and the sine wave signal value of the AE wave after the change (step ST3f-2).

For example, when it is determined that the sine wave signal value of the AE wave has stabilized from the increasing trend, the sine wave signal value of the AE wave before increasing is the average value Va of the N-cycle peak values of the sine wave signal of the AE wave illustrated in FIG. 15C. The sine wave signal value of the AE wave when the AE wave has stabilized after increasing is the average value Vx of the peak values illustrated in FIG. 15C. In a case where the sine wave signal value of the AE wave has stabilized from the increasing trend, the change amount calculating unit 435 calculates an absolute value of a value obtained by subtracting Va from Vx as the change amount Vc of the sine wave signal value of the AE wave caused by the suddenly generated vibration. In addition, in a case where it is determined that the sine wave signal value of the AE wave illustrated in FIG. 15D has stabilized from the decreasing trend and the sine wave signal value of the AE wave before decreasing is the average value Va of the N-cycle peak values of the sine wave signal of the AE wave, the change amount calculating unit 435 calculates the absolute value of the value obtained by subtracting Va from Vx as the change amount Vc.

When it is determined that the sine wave signal value of the AE wave decreases, then turns to increasing, and becomes stable (step ST2f; decreasing→increasing→stable), the change amount calculating unit 435 calculates an addition value of the sine wave signal value of the AE wave before decreasing and the sine wave signal value of the AE wave when the AE wave has stabilized after turning to increasing as the change amount of the sine wave signal value of the AE wave in the change trend turning from decreasing to increasing (step ST3f-3). For example, in a case where the sine wave signal value of the AE wave before decreasing is the average value Va of the N-cycle peak values of the sine wave signal of the AE wave illustrated in FIG. 15E, and the sine wave signal value of the AE wave when the AE wave has stabilized after turning to increasing is the average value Vy of the N-cycle peak values of the sine wave signal of the AE wave, the change amount calculating unit 435 calculates an absolute value of a value obtained by adding Vy and Va as the change amount Vd of the sine wave signal value of the AE wave caused by the suddenly generated vibration. The change amount of the sine wave signal value of the AE wave calculated by the change amount calculating unit 435 is output to the output control unit 436. Thereafter, the processing of step ST5e of FIG. 18 is executed.

The functions of the A/D conversion unit 41, the extraction unit 42A, and the output processing unit 43A in the vibration detection device 4D are implemented by a processing circuit. That is, the vibration detection device 4D includes a processing circuit for executing the processing from step ST1e to step ST5e shown in FIG. 18. The processing circuit may be the processing circuit 102 of dedicated hardware shown in FIG. 7A or the processor 103 that executes programs stored in the memory 104 shown in FIG. 7B.

As described above, the vibration detection device 4D according to the fifth embodiment includes the A/D conversion unit 41, the extraction unit 42A, the change trend determination unit 434, the change amount calculating unit 435, and the output control unit 436. The change trend determination unit 434 uses the data points every the plurality of cycles of the sine wave signal of the AE wave extracted by the extraction unit 42 to determine which change trend of a stable trend, an increasing trend, a decreasing trend, or a change trend turning from decreasing to increasing the sine wave signal of the AE wave has. The change amount calculating unit 435 calculates the change amount in the sine wave signal value of the AE wave that is changed with the change trend determined by the change trend determination unit 434. The output control unit 436 outputs a change amount corresponding to the change trend of the sine wave signal of the AE wave calculated by the change amount calculating unit 435. Since it is determined which change trend of a stable trend, an increasing trend, a decreasing trend, or a change trend turning from decreasing to increasing the sine wave signal value of the AE wave generated in the target machine 2 has, the vibration detection device 4D can detect the suddenly generated vibration even when the AE wave caused by the vibration continuously generated in the target machine 2 and the AE wave caused by the suddenly generated vibration are mutually weakened.

Note that combinations of each embodiments, modifications of any components of each of the embodiments, or omissions of any components in each of the embodiments are possible.

INDUSTRIAL APPLICABILITY

The vibration detection device according to the present disclosure can be used for detecting vibration of a rotary machine, for example.

REFERENCE SIGNS LIST 1, 1A, 1B, 1C, 1D: abnormality determination system, 2: target machine, 3: AE sensor, 4, 4A, 4B, 4C, 4D: vibration detection device, 5, 5A: abnormality determination unit, 41: A/D conversion unit, 42, 42A, 42B: extraction unit, 43, 43A: output processing unit, 44, 44A: noise determination unit, 45, 45A: noise removal unit, 46: DC offset removal unit, 47: effective value calculating unit, 48: averaging processing unit, 100: input interface, 101: output interface, 102: processing circuit, 103: processor, 104: memory, 431: determination unit, 432: storage unit, 433, 436: output control unit, 434: change trend determination unit, 435: change amount calculating unit

The invention claimed is:

1. A vibration detection device comprising:
processing circuitry configured
to receive a sine wave signal of an acoustic emission wave corresponding to vibration generated in a target machine from an Acoustic Emission (AE) sensor that detects the acoustic emission wave,
to convert the received sine wave signal into digital data,
to extract a local maximum value of the sine wave signal from the digital data, the local maximum value of the sine wave signal being a maximum value within each cycle of the sine wave signal in the digital data, and
to output the local maximum value of the sine wave signal to an abnormality determination apparatus that determines existence of an abnormality of the target machine based on a change in the local maximum value,
wherein the processing circuitry is further configured
to determine, as noise, a data point included in inverting data points and not corresponding to a peak position of a cycle of the sine wave signal, an increasing or decreasing trend between each of the inverting data points and a data point extracted immediately before being inverted, and an increasing or decreasing trend between said each of the inverting data points and the data point extracted immediately after being inverted, and
to remove the noise from the local maximum value extracted.

2. The vibration detection device according to claim 1, wherein the processing circuitry is further configured
to determine noise in the digital data, and
to remove the noise from the digital data.

3. The vibration detection device according to claim 1, wherein the processing circuitry is further configured
to determine, as noise, a data point which does not correspond to a peak position of a cycle of the sine wave signal among data points corresponding to the digital data, and
to remove the noise from the digital data.

4. The vibration detection device according to claim 1, wherein the processing circuitry is further configured to visibly output data points corresponding to the digital data and having the number of points which can be recognized as a sine wave and to visibly output the local maximum value.

5. The vibration detection device according to claim 1, wherein the processing circuitry is further configured
to determine which change trend of a stable trend, an increasing trend, a decreasing trend, or a change trend turning from decreasing to increasing the sine wave signal has by using the local maximum value for each of a plurality of cycles of the sine wave signal,
to calculate a change amount of a value of the sine wave signal that is changed with the change trend, and
to output the change amount and corresponding to the change trend of the sine wave signal.

6. The vibration detection device according to claim 5, wherein the processing circuitry is further configured
to set a value indicating output stability as the change amount of the value of sine wave signal when the sine wave signal is determined to have the stable trend,
to calculate a difference between the value of the sine wave signal before increasing and the value of the sine wave signal when the value of the sine wave signal becomes stable after increasing as the change amount of the value of the sine wave signal when the sine wave signal is determined to become stable from the increasing trend,
to calculate a difference between the value of the sine wave signal before decreasing and the value of the sine wave signal when the value of the sine wave signal becomes stable after decreasing as the change amount of the value of the sine wave signal when the sine wave signal is determined to become stable from the decreasing trend, and
to calculate, as the change amount of the value of the sine wave signal, an addition value of the value of the sine wave signal before decreasing and the value of the sine wave signal when the value of the sine wave signal becomes stable after turning from decreasing to increasing when the sine wave signal is determined to become stable after turning from decreasing to increasing.

7. The vibration detection device according to claim 5, wherein the processing circuitry is further configured, by using the data points of the sine wave signal, to determine which of a change trend that turns from increasing to decreasing, a change trend that turns from decreasing to increasing, a change trend that turns from decreasing to increasing and then turns from decreasing to increasing, or a change trend that turns from decreasing to increasing and then turns to decreasing the sine wave signal has.

8. An abnormality determination system comprising:
a vibration detection device according to claim 1, wherein the processing circuitry is further configured
to determine an abnormality of the target machine on a basis of a change in the local maximum value of the sine wave signal.

9. The abnormality determination system according to claim 8, wherein the processing circuitry further performs
to remove a DC offset from the digital data;
to calculate effective values of the digital data from which the DC offset is removed; and
to calculate an average value of the effective values of the digital data, wherein the processing circuitry determines a deterioration state of the target machine on a basis of the average value.

10. The vibration detection device according to claim 1, wherein:
the determination apparatus is included in the vibration detection device and is configured to determine the abnormality of the target machine based on a comparison of the local maximum value to a previously stored value.

11. The vibration detection device according to claim 1, further comprising:
a display configured to display the extracted local maximum value within each of a plurality of cycles of the sine wave signal in the digital data from which an inspection worker can determine whether the digital data includes noise.

12. A vibration detection device comprising:
processing circuitry configured
to receive a sine wave signal of an acoustic emission wave corresponding to vibration generated in a target machine from an Acoustic Emission (AE) sensor that detects the acoustic emission wave,
to convert the received sine wave signal into digital data,
to extract data points of a local maximum value from the digital data, each of the data points of the local maximum value being a data point having a local maximum value for each cycle of the sine wave signal,
to determine noise in the digital data, and
to remove the noise from the digital data, wherein
the processing circuitry determines, as the noise, a data point not corresponding to a peak position of a cycle of the sine wave signal among the data points extracted from the digital data, wherein the processing circuitry extracts data points of a local minimum value from the digital data, each of the data points of the local minimum value is a data point having a local minimum value for each cycle of the sine wave signal, and inverts a sign of each of the data points of the local minimum value.

13. The vibration detection device according to claim 12, wherein the processing circuitry removes data points of a cycle that include the noise from the digital data.

14. The vibration detection device according to claim 12, wherein the processing circuitry is further configured
to remove the noise included in a cycle of the sine wave signal, and
to extract a data point of a local maximum value from data points of the cycle of the sine wave signal from which noise is removed.

15. A vibration detection method performed by processing circuitry, the method comprising:
receiving a sine wave signal of an acoustic emission wave corresponding to vibration generated in a target machine from an Acoustic Emission (AE) sensor that detects the acoustic emission wave, and converting the received sine wave signal into digital data;
extracting a local maximum value of the sine wave signal from the digital data, the local maximum value of the sine wave signal being a maximum value within each cycle of the sine wave signal in the digital data;
extracting data points of a local minimum value from the digital data, each of the data points of the local minimum value is a data point having a local minimum value for each cycle of the sine wave signal, and inverts a sign of each of the data points of the local minimum value; and
outputting the local maximum value of the sine wave signal to an abnormality determination apparatus that determines existence of an abnormality of the target machine based on a change in the local maximum value.

16. The vibration detection method according to claim 15, further comprising:
determining noise in the digital data; and
removing the noise from the digital data.

17. The vibration detection method according to claim 15, further comprising:
determining, as noise, a data point which does not correspond to a peak position of a cycle of the sine wave signal among data points corresponding to the digital data; and
removing the noise from the digital data.

18. The vibration detection method according to claim 15, further comprising:
determining which change trend of a stable trend, an increasing trend, a decreasing trend, or a change trend turning from decreasing to increasing the sine wave signal has by using the local maximum value for each of a plurality of cycles of the sine wave signal;
calculating a change amount of a value of the sine wave signal that is changed with the change trend; and
outputting the change amount and corresponding to the change trend of the sine wave signal.

* * * * *